(12) United States Patent
Robison et al.

(10) Patent No.: US 8,642,935 B2
(45) Date of Patent: *Feb. 4, 2014

(54) MICROWAVE INTERACTIVE FLEXIBLE PACKAGING

(75) Inventors: Richard G. Robison, Appleton, WI (US); Lorin R. Cole, Larsen, WI (US); Timothy H. Bohrer, Chicago, IL (US); Scott W. Middleton, Oshkosh, WI (US); Terrence P. Lafferty, Winneconne, WI (US); Brian R. O'Hagan, Appleton, WI (US); Patrick H. Wnek, Sherwood, WI (US)

(73) Assignee: Graphic Packaging International, Inc., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,701

(22) Filed: Jun. 9, 2011

(65) Prior Publication Data

US 2011/0233202 A1 Sep. 29, 2011

Related U.S. Application Data

(60) Division of application No. 11/981,020, filed on Oct. 31, 2007, now Pat. No. 8,013,280, which is a continuation of application No. 11/096,440, filed on Apr. 1, 2005, now Pat. No. 7,323,669, which is a continuation-in-part of application No. 10/501,003, filed as application No. PCT/US03/03779 on Feb. 7, 2003, now Pat. No. 7,019,271, said application No. 11/981,020 is a continuation-in-part of application No. 11/054,633, filed on Feb. 9, 2005, now Pat. No. 7,365,292.

(60) Provisional application No. 60/355,149, filed on Feb. 8, 2002, provisional application No. 60/543,364, filed on Feb. 9, 2004.

(51) Int. Cl.
*H05B 6/80* (2006.01)

(52) U.S. Cl.
USPC ............ 219/730; 219/678; 219/725; 219/727

(58) Field of Classification Search
USPC ........................... 219/725–735; 426/106–131
See application file for complete search history.

(56) References Cited

U.S. PATENT DOCUMENTS

| | | |
|---|---|---|
| 3,098,583 A | 7/1963 | Sherman et al. |
| 3,967,998 A | 7/1976 | Kane |

(Continued)

FOREIGN PATENT DOCUMENTS

| | | |
|---|---|---|
| DE | 101 02 239 A1 | 4/2002 |
| EP | 0 421 710 A2 | 4/1991 |

(Continued)

OTHER PUBLICATIONS

Dictionary of Engineering, Definition of "Ohms Per Square", 2012 Dictionary of Engineering, <http://www.dictionaryofengineering.com/definition/ohms-per-square.html> (1 page).

*Primary Examiner* — Thor Campbell
(74) *Attorney, Agent, or Firm* — Womble Carlyle Sandridge & Rice, LLP

(57) ABSTRACT

A microwave energy interactive structure includes a layer of indium tin oxide, which may be supported on a microwave energy transparent substrate. In one embodiment, the microwave energy interactive structure may have at least one of an oxygen transmission rate of less than about 0.05 cc/m²/day and a water vapor transmission rate of less than about 0.09 g/m²/day.

125 Claims, 12 Drawing Sheets

(56) References Cited

U.S. PATENT DOCUMENTS

| | | | |
|---|---|---|---|
| 4,132,811 A | 1/1979 | Standing et al. | |
| 4,196,331 A | 4/1980 | Leveckis et al. | |
| 4,220,684 A | 9/1980 | Olson | |
| 4,241,865 A | 12/1980 | Ferrell | |
| 4,260,060 A | 4/1981 | Faller | |
| 4,267,420 A | 5/1981 | Brastad | |
| 4,267,955 A | 5/1981 | Struble | |
| 4,268,738 A | 5/1981 | Flautt, Jr. et al. | |
| 4,286,136 A | 8/1981 | Mason, Jr. | |
| 4,337,889 A | 7/1982 | Moertel | |
| 4,404,241 A | 9/1983 | Mueller et al. | |
| 4,461,031 A | 7/1984 | Blamer | |
| 4,574,174 A | 3/1986 | McGonigle | |
| 4,586,988 A * | 5/1986 | Nath et al. | 205/123 |
| 4,637,063 A | 1/1987 | Sullivan et al. | |
| 4,641,005 A * | 2/1987 | Seiferth | 219/730 |
| 4,745,249 A | 5/1988 | Daniels | |
| 4,775,771 A | 10/1988 | Pawlowski | |
| 4,777,053 A | 10/1988 | Tobelmann et al. | |
| 4,782,951 A | 11/1988 | Griesbach et al. | |
| 4,785,937 A | 11/1988 | Tamezawa et al. | |
| 4,786,190 A | 11/1988 | Van Erden et al. | |
| 4,786,513 A | 11/1988 | Monforton et al. | |
| 4,825,025 A * | 4/1989 | Seiferth | 219/730 |
| 4,833,007 A * | 5/1989 | Huang | 426/243 |
| 4,848,931 A | 7/1989 | Kamada et al. | |
| 4,851,632 A | 7/1989 | Kaliski | |
| 4,865,921 A | 9/1989 | Hollenberg et al. | |
| 4,876,423 A * | 10/1989 | Tighe et al. | 219/759 |
| 4,883,936 A | 11/1989 | Maynard et al. | |
| 4,890,439 A * | 1/1990 | Smart | 53/410 |
| 4,894,247 A | 1/1990 | Fong | |
| 4,914,266 A | 4/1990 | Parks et al. | |
| 4,916,280 A | 4/1990 | Havette | |
| 4,925,316 A | 5/1990 | Van Erden et al. | |
| 4,933,193 A | 6/1990 | Fisher | |
| 4,936,935 A | 6/1990 | Beckett | |
| 4,943,456 A | 7/1990 | Pollart et al. | |
| 4,950,859 A | 8/1990 | Anderson | |
| 4,962,293 A | 10/1990 | Lackey | |
| 4,963,424 A | 10/1990 | Beckett | |
| 4,985,300 A * | 1/1991 | Huang | 428/332 |
| 5,003,142 A | 3/1991 | Fuller | |
| 5,006,684 A | 4/1991 | Wendt et al. | |
| 5,020,194 A | 6/1991 | Herrington et al. | |
| 5,041,325 A | 8/1991 | Larson et al. | |
| 5,044,777 A | 9/1991 | Watkins et al. | |
| 5,053,594 A | 10/1991 | Thota et al. | |
| 5,077,455 A | 12/1991 | Peleg et al. | |
| 5,081,330 A | 1/1992 | Brandberg et al. | |
| 5,084,601 A | 1/1992 | Andreas et al. | |
| 5,093,364 A | 3/1992 | Richards et al. | |
| 5,117,078 A | 5/1992 | Beckett | |
| 5,124,519 A | 6/1992 | Roy et al. | |
| 5,164,562 A | 11/1992 | Huffman et al. | |
| 5,177,332 A | 1/1993 | Fong | |
| 5,180,894 A | 1/1993 | Quick et al. | |
| 5,213,902 A | 5/1993 | Beckett | |
| 5,217,768 A | 6/1993 | Walters et al. | |
| 5,221,419 A | 6/1993 | Beckett | |
| 5,224,779 A | 7/1993 | Thompson et al. | |
| 5,230,914 A | 7/1993 | Akervik | |
| 5,231,268 A | 7/1993 | Hall et al. | |
| 5,239,153 A | 8/1993 | Beckett | |
| 5,256,846 A | 10/1993 | Walters | |
| 5,260,536 A | 11/1993 | Peery | |
| 5,260,537 A | 11/1993 | Beckett | |
| 5,266,386 A | 11/1993 | Beckett | |
| 5,294,763 A | 3/1994 | Chamberlain et al. | |
| 5,317,118 A | 5/1994 | Brandberg et al. | |
| RE34,683 E | 8/1994 | Maynard et al. | |
| 5,338,921 A | 8/1994 | Maheux et al. | |
| 5,340,436 A | 8/1994 | Beckett | |
| 5,354,973 A | 10/1994 | Beckett | |
| 5,357,086 A | 10/1994 | Turpin et al. | |
| 5,389,767 A | 2/1995 | Dobry | |
| 5,396,052 A * | 3/1995 | Petcavich et al. | 219/725 |
| 5,405,663 A | 4/1995 | Archibald et al. | |
| 5,410,135 A | 4/1995 | Pollart | |
| 5,424,517 A | 6/1995 | Habeger | |
| 5,435,864 A | 7/1995 | Machacek et al. | |
| 5,446,270 A | 8/1995 | Chamberlain et al. | |
| 5,456,928 A | 10/1995 | Hustad et al. | |
| 5,484,984 A | 1/1996 | Gics | |
| 5,489,766 A | 2/1996 | Walters et al. | |
| 5,510,132 A | 4/1996 | Gallo, Jr. | |
| 5,519,195 A | 5/1996 | Keefer | |
| 5,543,606 A | 8/1996 | Gics | |
| 5,565,125 A | 10/1996 | Parks | |
| 5,582,853 A | 12/1996 | Marnocha et al. | |
| 5,628,921 A | 5/1997 | Beckett | |
| 5,630,959 A | 5/1997 | Owens | |
| 5,672,407 A | 9/1997 | Beckett | |
| 5,688,427 A | 11/1997 | Gallo, Jr. | |
| 5,690,853 A | 11/1997 | Jackson et al. | |
| 5,759,422 A | 6/1998 | Schmelzer | |
| 5,773,801 A | 6/1998 | Blamer et al. | |
| 5,780,824 A | 7/1998 | Matos | |
| 5,800,724 A | 9/1998 | Habeger | |
| 5,843,501 A | 12/1998 | Rubin et al. | |
| 5,911,358 A | 6/1999 | Kenner et al. | |
| 5,921,681 A | 7/1999 | Money | |
| 5,964,532 A | 10/1999 | St. Phillips et al. | |
| 5,994,685 A | 11/1999 | Jackson et al. | |
| 6,005,234 A | 12/1999 | Moseley et al. | |
| 6,016,950 A | 1/2000 | Money | |
| 6,018,157 A | 1/2000 | Craft | |
| 6,060,096 A | 5/2000 | Hanson et al. | |
| 6,093,920 A | 7/2000 | Beckwith | |
| 6,100,513 A | 8/2000 | Jackson et al. | |
| 6,114,679 A | 9/2000 | Lai | |
| 6,133,560 A | 10/2000 | Zeng et al. | |
| 6,137,098 A | 10/2000 | Moseley et al. | |
| 6,150,646 A | 11/2000 | Lai | |
| 6,150,647 A | 11/2000 | Anderson et al. | |
| 6,204,492 B1 | 3/2001 | Zeng et al. | |
| 6,251,451 B1 | 6/2001 | Zeng | |
| 6,303,913 B1 | 10/2001 | Bono et al. | |
| 6,303,914 B1 | 10/2001 | Bono et al. | |
| 6,335,042 B1 | 1/2002 | Money | |
| 6,359,272 B1 | 3/2002 | Sadek et al. | |
| 6,378,177 B1 | 4/2002 | Athans et al. | |
| 6,414,288 B1 | 7/2002 | Bono et al. | |
| 6,414,290 B1 | 7/2002 | Cole et al. | |
| 6,431,365 B1 | 8/2002 | Money | |
| 6,433,322 B2 | 8/2002 | Zeng | |
| 6,436,457 B1 | 8/2002 | Poss | |
| 6,455,084 B2 | 9/2002 | Johns | |
| 6,455,827 B2 | 9/2002 | Zeng | |
| 6,486,455 B1 | 11/2002 | Merabet | |
| 6,501,059 B1 | 12/2002 | Mast | |
| 6,552,315 B2 | 4/2003 | Zeng | |
| 6,637,939 B2 | 10/2003 | Huffer | |
| 6,677,563 B2 | 1/2004 | Lai | |
| 6,683,289 B2 | 1/2004 | Whitmore et al. | |
| 6,717,121 B2 | 4/2004 | Zeng | |
| 6,744,028 B2 | 6/2004 | Chisholm et al. | |
| 6,765,182 B2 | 7/2004 | Cole | |
| 6,880,973 B2 | 4/2005 | Schneider et al. | |
| 6,935,321 B1 | 8/2005 | Sullivan et al. | |
| 7,019,271 B2 | 3/2006 | Wnek et al. | |
| 7,022,959 B2 | 4/2006 | Cole | |
| 7,294,811 B2 * | 11/2007 | Kawashima et al. | 219/405 |
| 7,323,669 B2 * | 1/2008 | Robison et al. | 219/730 |
| 7,351,942 B2 | 4/2008 | Wnek et al. | |
| 7,365,292 B2 | 4/2008 | Cole et al. | |
| 7,541,562 B2 | 6/2009 | Cole et al. | |
| 8,013,280 B2 * | 9/2011 | Robison et al. | 219/727 |
| 8,063,345 B2 * | 11/2011 | Middleton et al. | 219/730 |
| 2003/0152296 A1 | 8/2003 | Huffer | |
| 2003/0206997 A1 | 11/2003 | Winkelman et al. | |
| 2004/0069157 A1 | 4/2004 | Lin | |
| 2004/0121054 A1 | 6/2004 | Berrier et al. | |
| 2004/0173607 A1 | 9/2004 | Blankenbeckler et al. | |

(56) References Cited

U.S. PATENT DOCUMENTS

| | | |
|---|---|---|
| 2005/0205565 A1 | 9/2005 | Cole |
| 2006/0049190 A1 | 3/2006 | Middleton |
| 2006/0113300 A1 | 6/2006 | Wnek |
| 2006/0138128 A1 | 6/2006 | Cole |
| 2006/0157480 A1 | 7/2006 | Lafferty |
| 2006/0289521 A1 | 12/2006 | Bohme |
| 2006/0289522 A1 | 12/2006 | Middleton |
| 2007/0039951 A1* | 2/2007 | Cole .............................. 219/725 |
| 2007/0215611 A1* | 9/2007 | O'Hagan et al. ............... 219/730 |
| 2008/0067169 A1* | 3/2008 | Lafferty et al. ................ 219/730 |
| 2008/0078759 A1 | 4/2008 | Wnek et al. |
| 2008/0081095 A1 | 4/2008 | Cole et al. |
| 2008/0110877 A1* | 5/2008 | Cole .............................. 219/725 |
| 2009/0050520 A1* | 2/2009 | Cambay ........................ 206/784 |
| 2009/0078698 A1* | 3/2009 | Middleton et al. ............. 219/729 |
| 2009/0084781 A1* | 4/2009 | Middleton et al. ............. 219/730 |
| 2009/0223951 A1* | 9/2009 | Lai et al. ....................... 219/729 |
| 2009/0272736 A1* | 11/2009 | Cole .............................. 219/730 |
| 2011/0233202 A1* | 9/2011 | Robison et al. ................ 219/730 |
| 2012/0000905 A1* | 1/2012 | Noyelle et al. ................ 219/730 |
| 2012/0187114 A1* | 7/2012 | Fitzwater ...................... 219/730 |

FOREIGN PATENT DOCUMENTS

| | | | |
|---|---|---|---|
| EP | 1 283 179 A1 | 2/2003 | |
| GB | 1328317 | 8/1973 | |
| GB | 2207589 A * | 2/1989 | ............... H05B 6/80 |
| WO | WO 91/07861 A1 | 5/1991 | |
| WO | WO 92/09503 A1 | 6/1992 | |
| WO | WO 93/01247 A1 | 1/1993 | |
| WO | WO 93/19566 A1 | 9/1993 | |
| WO | WO 97/11010 A1 | 3/1997 | |
| WO | WO 97/26778 A1 | 7/1997 | |
| WO | WO 00/50318 A2 | 8/2000 | |
| WO | WO 03/066435 A2 | 8/2003 | |
| WO | WO 2005/077783 A1 | 8/2005 | |

* cited by examiner

MICROWAVE INTERACTIVE FLEXIBLE PACKAGING

CROSS-REFERENCE TO RELATED APPLICATIONS

This application is a divisional of U.S. patent application Ser. No. 11/981,020, filed Oct. 31, 2007, now U.S. Pat. No. 8,013,280, which is a continuation of U.S. patent application Ser. No. 11/096,440, filed Apr. 1, 2005, now U.S. Pat. No. 7,323,669, which is a continuation-in-part of U.S. patent application Ser. No. 10/501,003. filed Mar. 7, 2005, now U.S. Pat. No. 7,019,271, which is the National Stage of International Application No. PCT/US03/03779, filed Feb. 7, 2003, which claims the benefit of U.S. Provisional Application No. 60/355,149, filed Feb. 8, 2002; and U.S, patent application Ser. No. 11/981,020 is a continuation-in-part of U.S. patent application Ser. No. 11/054,633 filed Feb. 9, 2005, now U.S. Pat. No. 7,365,292, which claims the benefit of U.S. Provisional Application No. 60/543,364 filed Feb. 9, 2004. The above-referenced applications and patents are each incorporated by reference herein in their entirety.

TECHNICAL FIELD

The present invention relates to packages for heating or cooking a food item. In particular, the invention relates to a package for heating or cooking a food item in a microwave oven.

BACKGROUND

Microwave ovens provide a convenient means of cooking and reheating food items. Frequently, users transport microwaveable food items from home to work or another location by placing the food item in a plastic bag, aluminum foil, plastic wrap, or a plastic container. Although some of such materials or containers may be placed in the microwave oven, such materials or containers often result in the food item being undesirably soggy. In contrast, by merely cooking the food item on a paper plate, napkin, paper towel, or other commonly available substrate, the food item often becomes dried out and hardened.

Many combinations of materials of different character have been used in microwave packaging to influence the effect of the microwave energy on the food product being heated. These microwave packaging materials may be microwave transparent, for example, paper, paperboard, or many plastics, or they may be microwave interactive, for example, metal foils or thin metal deposits. Microwave transparent materials generally provide, for example, food product support, packaging form, insulation, and vapor barrier functions in packaging. Microwave interactive materials generally provide, for example, enhanced surface heating, microwave shielding, enhanced microwave transmission, and energy distribution functions in packaging. Microwave packaging often is created and configured for a particular food product or type of food product using materials chosen to best exploit the cooking ability of a microwave oven with respect to that food product. However, such packaging typically is provided only with the particular food item and is not independently available for purchase and use with food items prepared by a user.

Thus, there is a need for a package for a food item that may be used to contain a food item, transport the item between locations, and heat or cook the food product therein. Further, there is a need for a package that provides browning and/or crisping of the food item during microwave heating or cooking. Still further, there is a need for a package that is available for purchase and use with food items prepared by a user.

SUMMARY

The present invention relates generally to a package that can be used for storing, transporting, and heating a food item therein. The package is formed at least partially from at least one material that enhances heating in a microwave oven.

In one aspect, the present invention is directed to a package for receiving a food item for storage and heating therein. The package comprises at least one opening, at least one mechanism for closing the at least one opening, and an insulating microwave material. The package includes an interior into which the food item is placed, and an interior surface on which the food is supported. The package further may include at least one vent to permit the passage of water vapor therefrom. The vent may be an aperture, perforation, or other suitable feature or, alternatively, may be a closure mechanism that is sealed only partially during heating, thereby permitting water vapor to escape.

In this and other aspects of the present invention, the closure mechanism may be any suitable mechanism as desired. For example, the interior surface of the package proximate the opening may include an adhesive material covering at least a portion thereof. Alternatively, the closure mechanism may be a zipper or slider-type closure. Alternatively still, the closure mechanism may include a flap extending from an open end of the package, where the flap is adapted to be inserted into the opening.

In yet another alternative, the closure mechanism may include a flap extending from an open end of the package, where the flap includes a mechanism for releasably sealing the package. In one aspect, the mechanism for releasably sealing the package may include an adhesive material covering at least a portion of the flap, where, for example, the flap is adapted to be folded over the opening such that the adhesive contacts an exterior surface of the package. In another aspect, the mechanism for releasably sealing the package may include a tab extending from the flap that communicates with a corresponding slot in the package.

In another aspect, the present invention is directed to a package for heating a food product comprising a sleeve formed at least partially from an insulating microwave material and having at least two open ends, where the sleeve has an interior surface comprising an adhesive covering at least a portion thereof for substantially sealing the package. In one aspect, the insulating microwave material comprises expandable insulating cells. In another aspect, the insulating microwave material comprises a susceptor material.

In yet another aspect, the present invention is directed to a package for storing and heating a food item therein, where the package is formed at least partially from an insulating material including a barrier film. The package comprises an opening through which the food item is received and a closure mechanism proximate the opening for substantially sealing the package. The barrier film may comprise ethylene vinyl alcohol, barrier nylon, polyvinylidene chloride, barrier fluoropolymer, nylon 6, nylon 6,6, coextruded nylon 6ethylene vinyl alcohol/nylon 6, silicon oxide coated film, or any combination thereof. In one aspect, the barrier film has an oxygen transmission rate of less than about 80 cc/m$^2$/day. In another aspect, the barrier film has an oxygen transmission rate of less than about 25 cc/m$^2$/day. In yet another aspect, the barrier film has a water vapor transmission rate of less than about 450 g/m$^2$/day.

In this and other aspects, the present invention contemplates a plurality of packages stacked in a face-to-face relation. The plurality of packages may be placed into a carton comprising an open portion through which the microwave cooking packages may be removed or dispensed.

Other aspects, features, and advantages of the present invention will become apparent from the following description and accompanying figures.

DESCRIPTION

Figure 1:
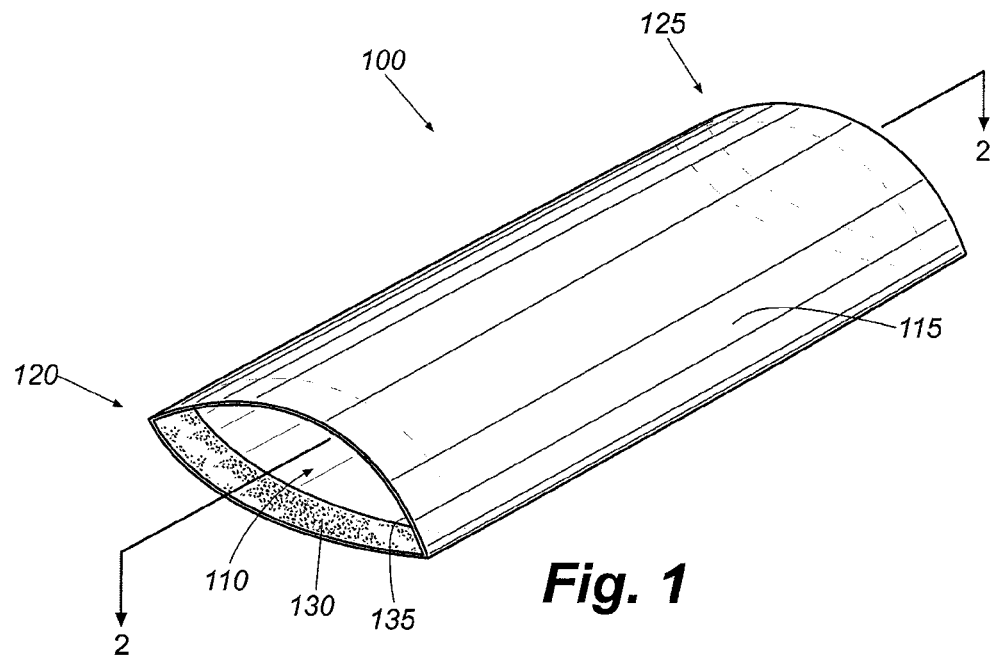
FIG. 1 depicts an exemplary package according to the present invention, in the form of a sleeve.

The present invention generally is directed to a disposable package for storing a food item, and browning and crisping the food item in a microwave oven. The package may be provided as a sleeve, a pouch, a bag, or any other configuration as desired. Unlike conventional sandwich bags, plastic containers, and the like, the package of the present invention includes features that store the item during transportation and brown and crisp the food item during the heating or cooking cycle in the microwave oven.

The sleeve or pouch may be provided with one or more features that allow the bag to be sealed during refrigeration, freezing, transportation, heating, or otherwise. In one aspect, the sleeve or pouch is provided with one or more strips of pressure-sensitive adhesive near the periphery thereof so that, after the food item is positioned, the package may be sealed around the edges of the food item. In another aspect, the sleeve or pouch is provided with an open portion for inserting the food item therein, and a flap adjacent thereto. The flap may be folded over to close the end and may be inserted into a slot to secure the food item therein. In yet another aspect, the flap is provided with an adhesive that secures the package when brought into contact with an exterior surface of the package. If desired, the feature for closing the package may be selected to substantially seal the package for protection of the food item during storage in a refrigerator or freezer, or to store or transport a food item that has a liquid component or other components that might tend to fall out of the package.

In any of the packages contemplated hereby, the sleeve or pouch may include one or more venting mechanisms. For example, the package may be provided with apertures or perforations that permit vapor to escape during cooking. Alternatively, the package may be re-opened partially or completely at one or more ends, edges, or locations to provide venting of the food product.

The present invention may be best understood by referring to the following figures. For purposes of simplicity, like numerals may be used to describe like features. However, it should be understood use of like numerals is not to be construed as an acknowledgement or admission that such features are equivalent in any manner.

FIGS. 1-14 depict several exemplary packages that may be formed according to the present invention. The exemplary packages have a sleeve or pouch configuration and are shown to be hand-held type packages. However, it should be understood that other shapes and configurations are contemplated by the present invention. Examples of other shapes encompassed hereby include, but are not limited to, polygons, circles, ovals, cylinders, prisms, spheres, polyhedrons, ellipsoids, and any other shape that may be formed into a three-dimensional package for receiving a food item therein. The shape of the package may be determined by the shape of the food product intended for use therewith, and it should be understood that different packages are contemplated for different food products, for example, sandwiches, corn dogs, pizzas, French fries, soft pretzels, pizza bites, cheese sticks, pastries, doughs, and so forth. Additionally, it should be understood that the present invention contemplates packages for single-serving portions and for multiple-serving portions, and is not restricted to hand-held packages. It also should be understood that various components used to form the packages of the present invention may be interchanged. Thus, while only certain combinations are illustrated herein, numerous other combinations and configurations are contemplated hereby.

Figure 2:
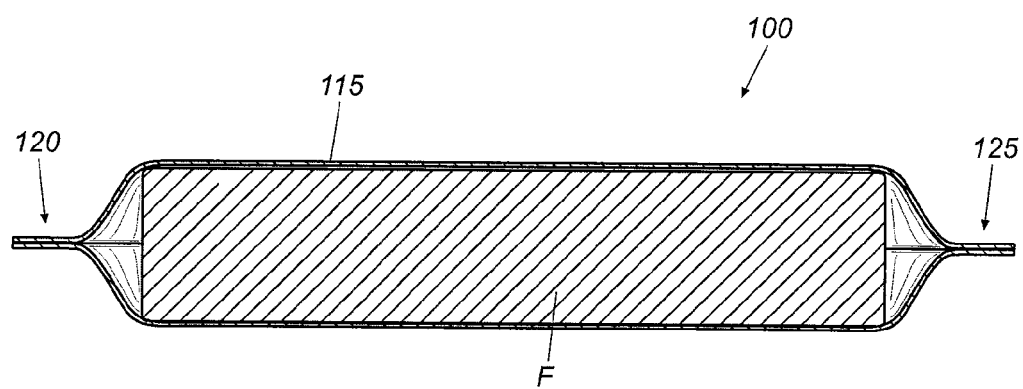
FIG. 2 is a cross-sectional view of the package of FIG. 1 with a food item contained therein.

According to one aspect of the present invention shown in FIGS. 1 and 2, the package comprises a sleeve 100 having an interior 110, an exterior surface 115, an open first end 120, and an open second end 125 (shown in dashed lines). Various closure mechanisms may be provided to seal the package for refrigeration, freezing, or transportation. For example, an adhesive strip 130 may be provided on the interior surface 135 of the sleeve 100 proximate the first end 120 and the second end 125. Any suitable adhesive may be used, and in some instances, the adhesive is a pressure-sensitive adhesive. As shown in FIG. 2, after the food item F is placed into the sleeve 100, the respective ends 120, 125 of the sleeve 100 may be pressed together to seal the food item F therein. If desired, the adhesive may be covered with a removable release liner, such as those known in the art.

Figure 3:
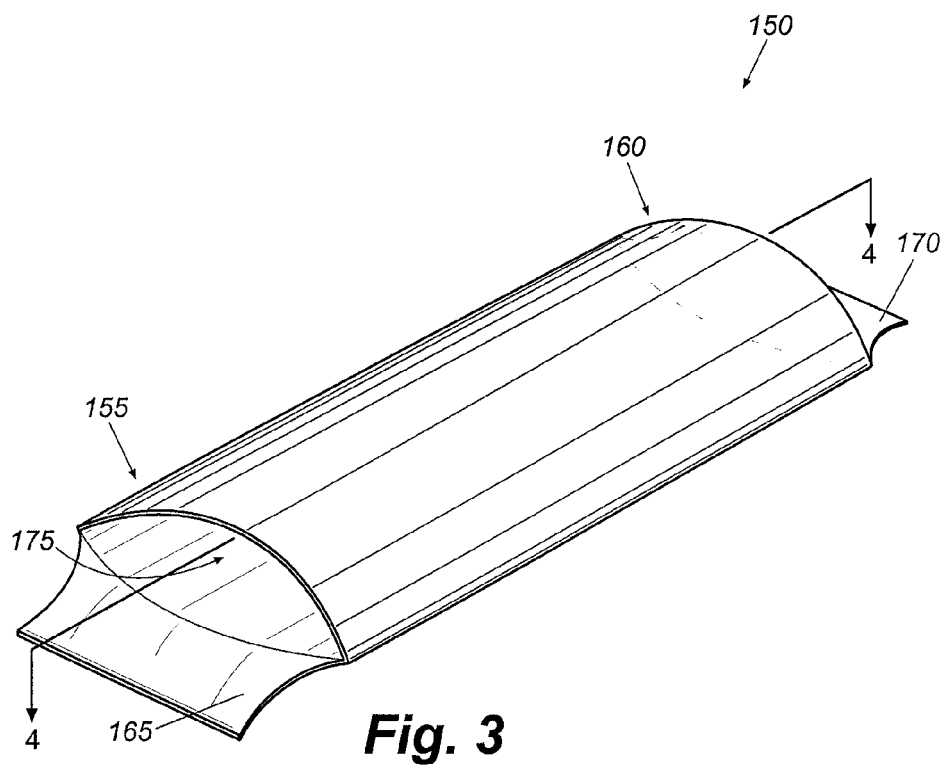
FIG. 3 depicts another exemplary package according to the present invention, in the form of a sleeve.
Figure 4:
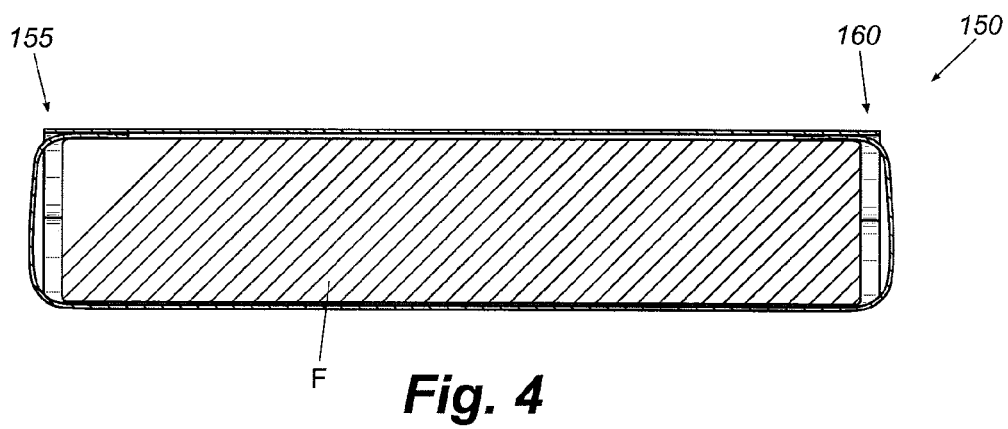
FIG. 4 is a cross-sectional view of the package of FIG. 3 with a food item contained therein.
Figure 5:
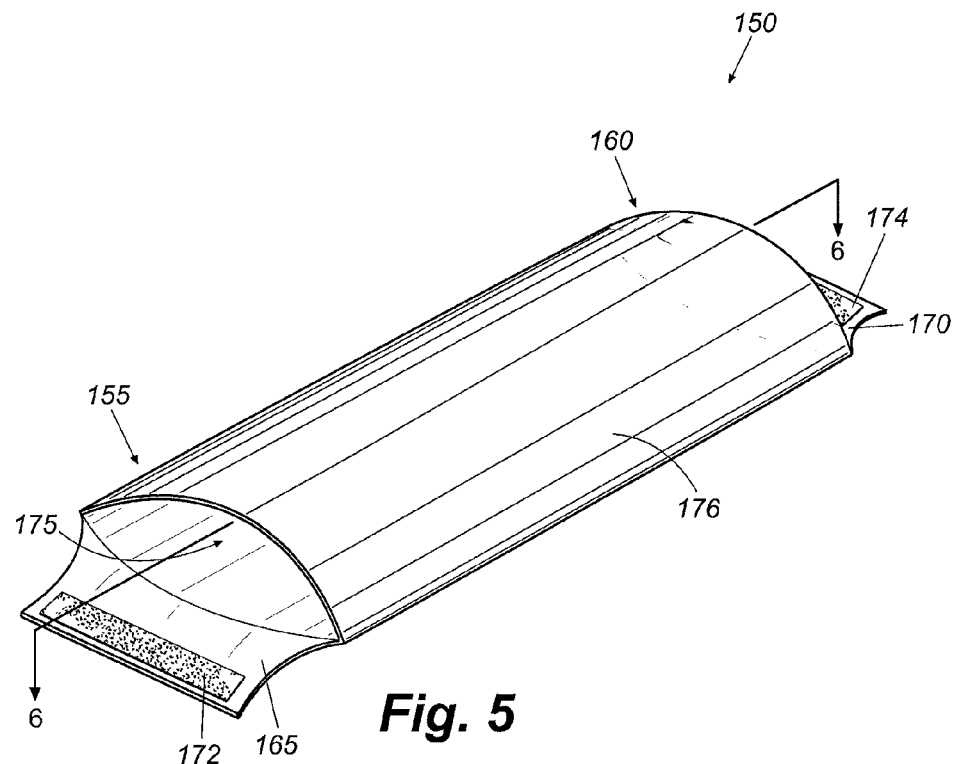
FIG. 5 depicts another exemplary package according to the present invention, in the form of a sleeve.
Figure 6:
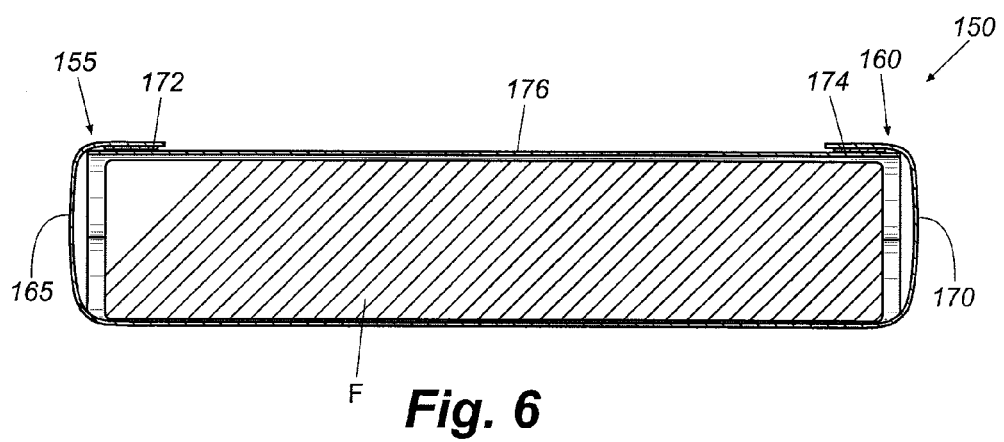
FIG. 6 is a cross-sectional view of the package of FIG. 5 with a food item contained therein.
Figure 7:
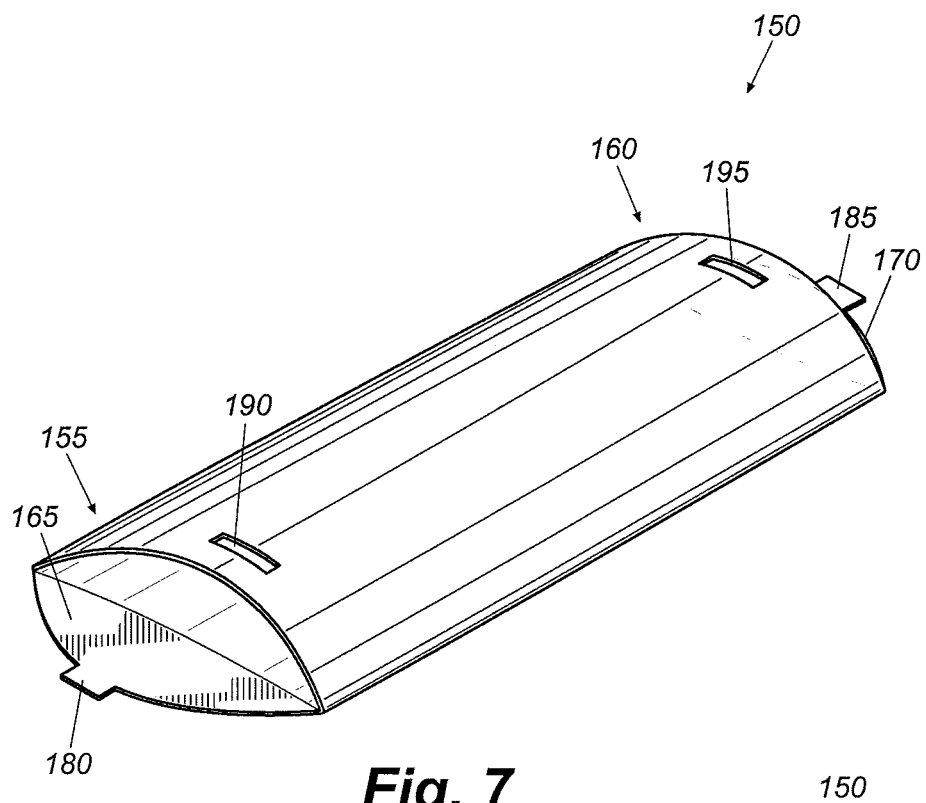
FIG. 7 depicts another exemplary package according to the present invention, in the form of a sleeve, in an open configuration.
Figure 8:
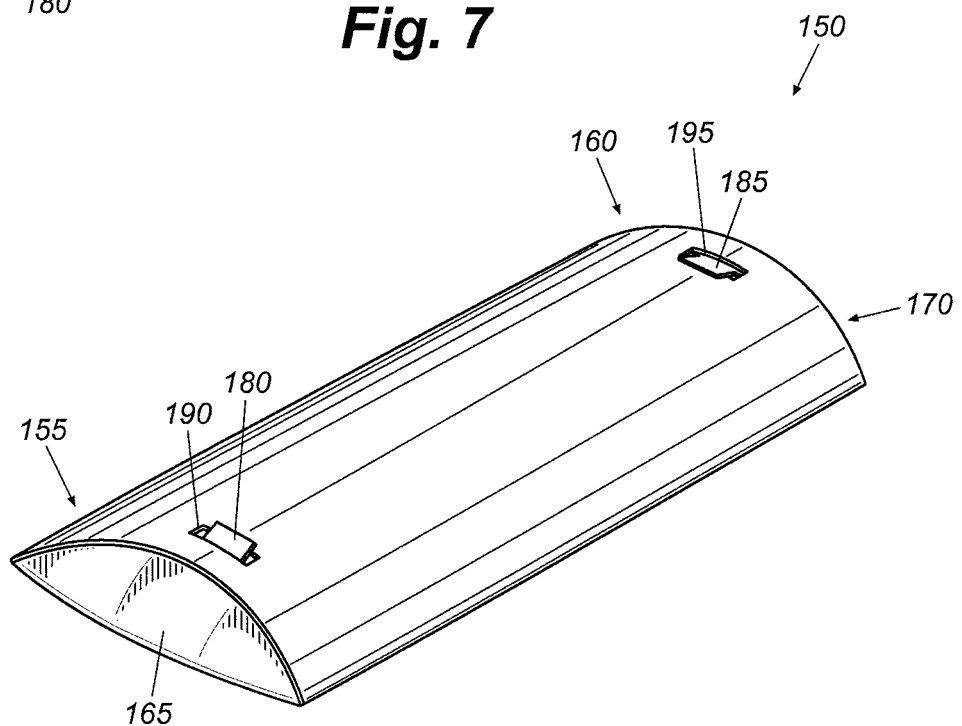
FIG. 8 depicts the package of FIG. 7 in a closed configuration.

Alternatively, as shown in FIGS. 3 and 4, the first end 155 and second end 160 of the sleeve 150 may include flaps 165, 170 that fold into the interior 175 of the sleeve 150 to enclose the food item F therein. Alternatively still, as shown in FIGS. 5 and 6, the flaps 165, 170 may include adhesive strips 172, 174 that are pressed against the exterior 176 of the package 150 to enclose the food product F therein. In another example shown in FIGS. 7 and 8, the flaps 165, 170 may include tabs 180, 185 or other projections that are inserted into corresponding slots 190, 195 in the sleeve 150. While various enclosure mechanisms are provided herein, it should be understood that the present invention contemplates numerous other closure mechanisms.

Figure 9:
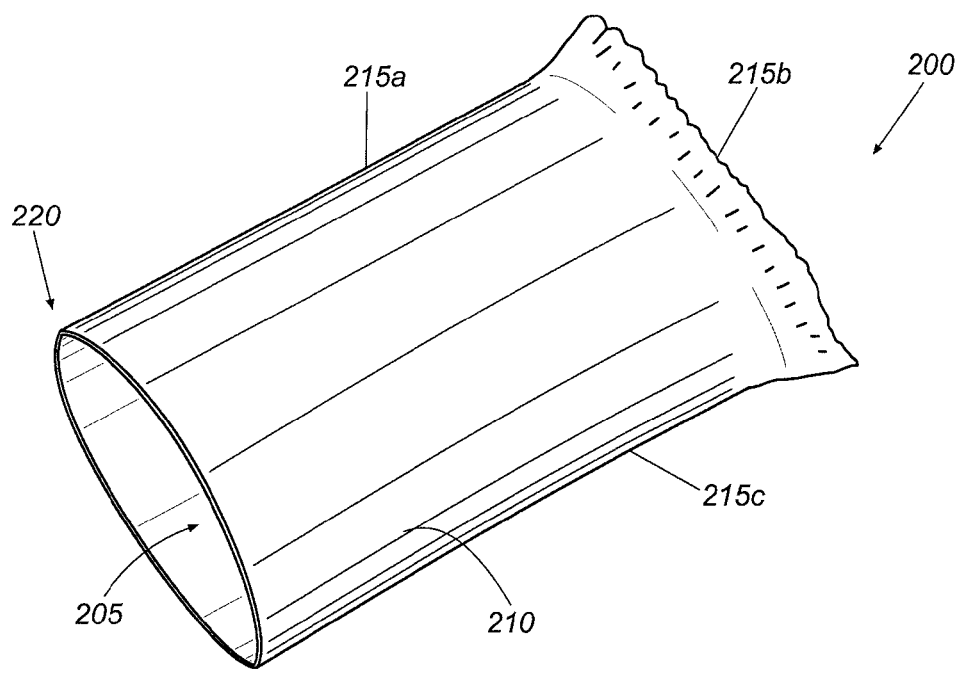
FIG. 9 depicts an exemplary package according to the present invention, in the form of a pouch.
Figure 10:
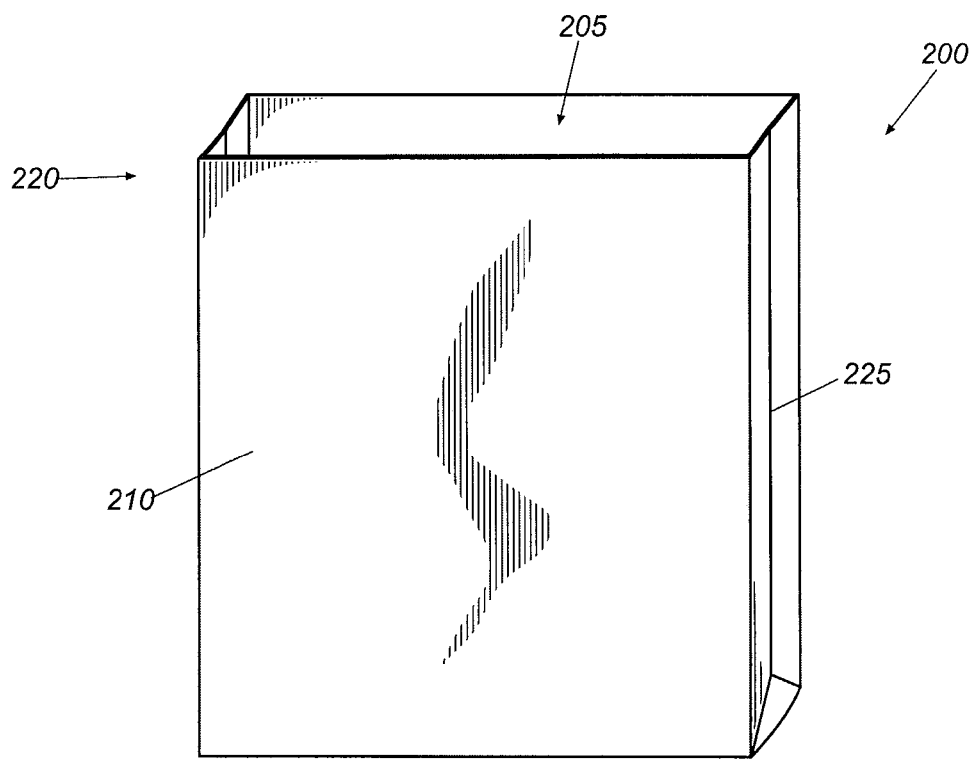
FIG. 10 depicts another exemplary package according to the present invention, in the form of a pouch.
Figure 11:
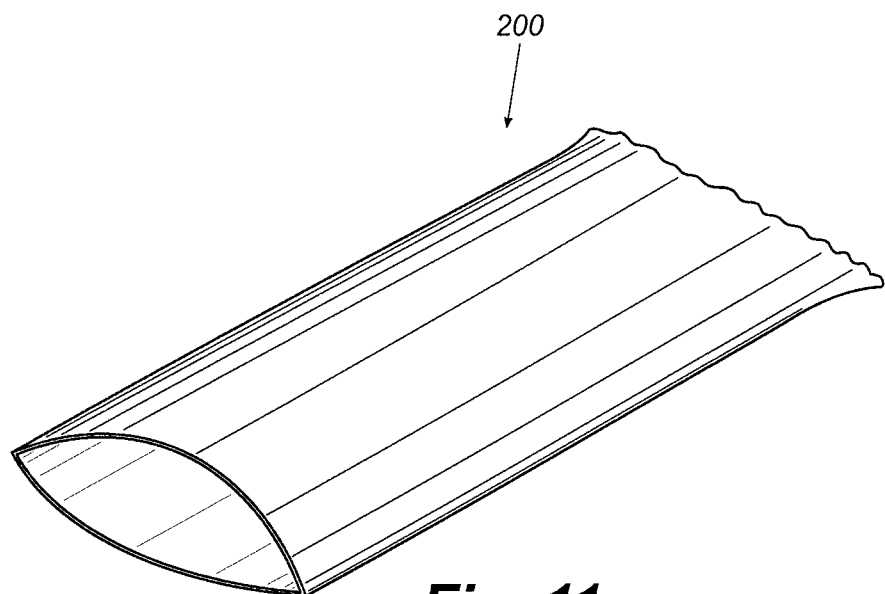
FIG. 11 depicts another exemplary package according to the present invention, in the form of a pouch.
Figure 12:
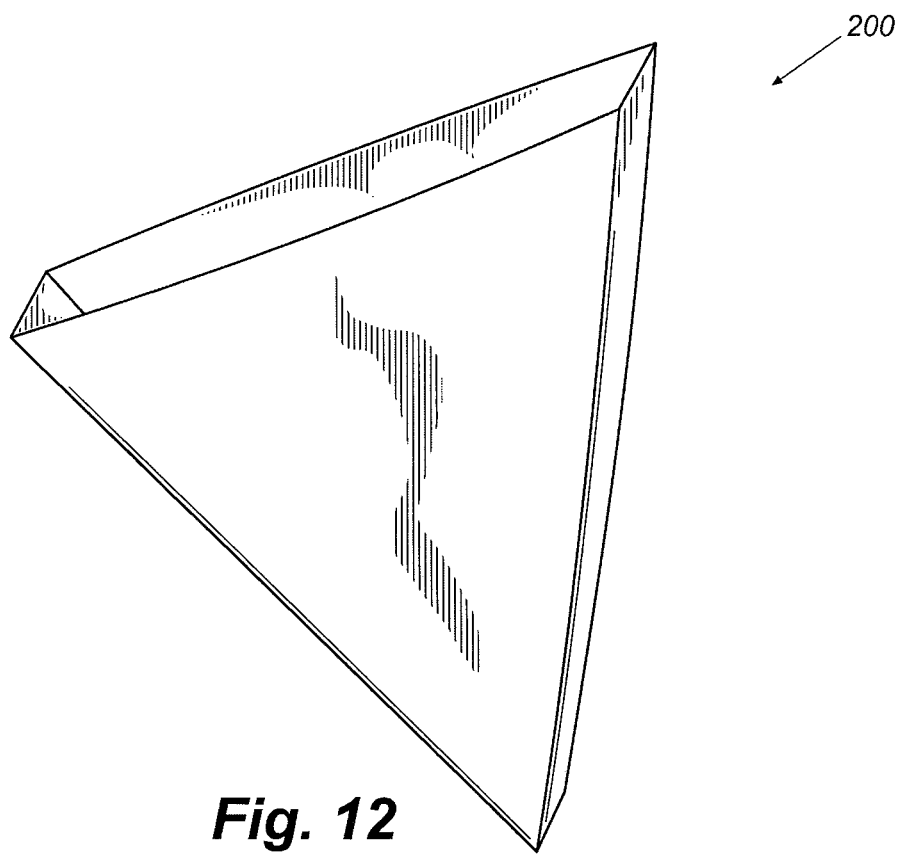
FIG. 12 depicts another exemplary package according to the present invention, in the form of a pouch.
Figure 13:
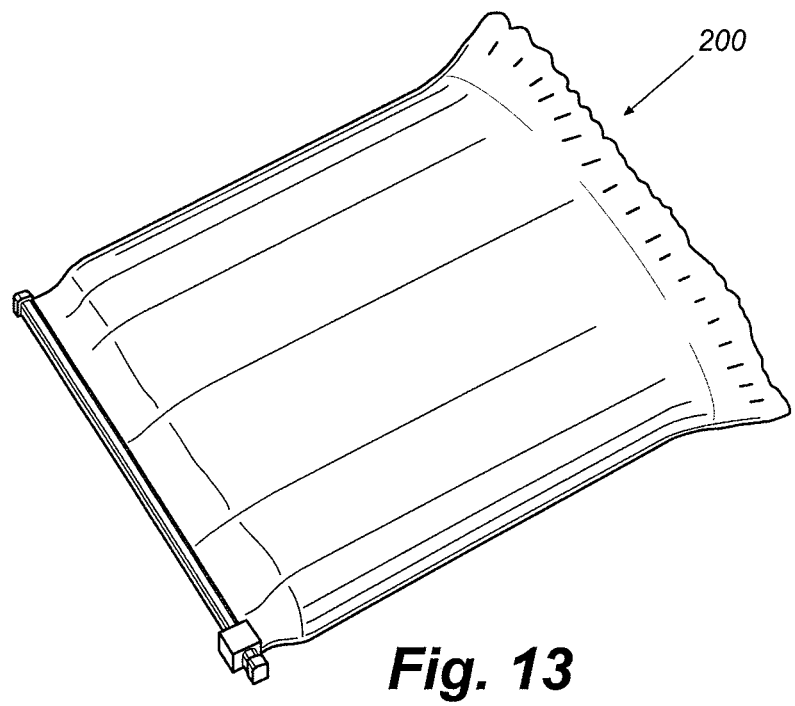
FIG. 13 depicts another exemplary package according to the present invention, in the form of a pouch.
Figure 14:
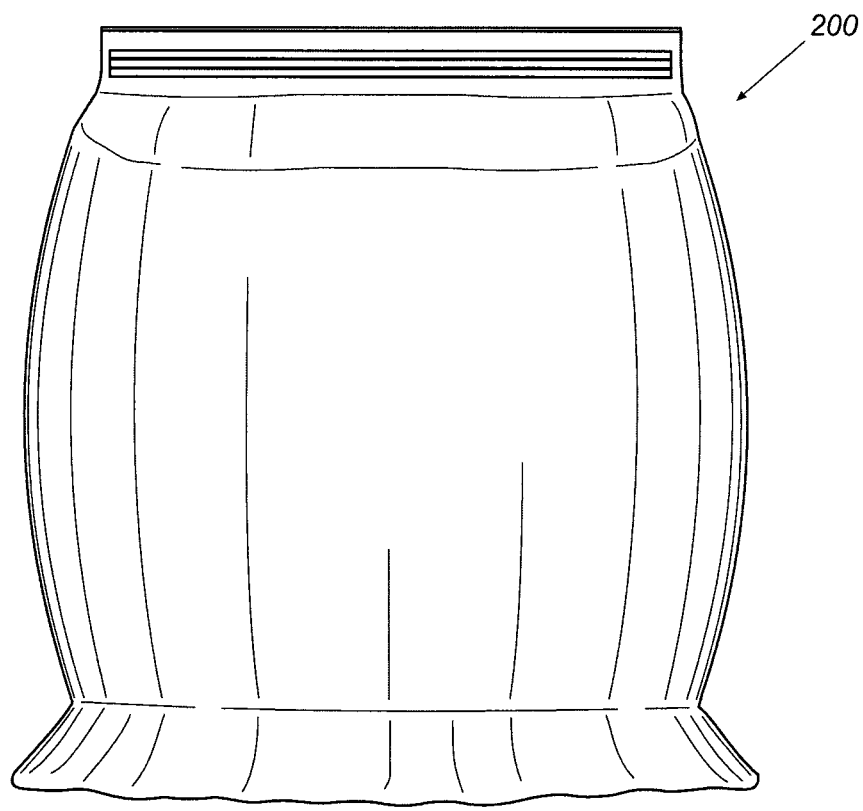
FIG. 14 depicts another exemplary package according to the present invention, in the form of a pouch.

According to another aspect of the present invention shown in FIG. 9, the package comprises a pouch 200 having an interior 205, an exterior surface 210, a plurality of sealed edges 215a, 215b, and 215c, and at least one open end 220 or open portion. The pouch 200 may be shaped and sized to receive one or more food items (not shown). For example, as shown in FIG. 10, the pouch 200 may be somewhat rectangular in shape and may include one or more gussets 225 as needed to accommodate larger or thicker food items (not shown), for example, one or more pieces of fried chicken. As shown in FIG. 11, the pouch 200 may be elongated in shape to accommodate, for example, a submarine sandwich, an egg roll, or burrito. As shown in FIG. 12, the pouch 200 may be triangular in shape to accommodate, for example, a slice of pizza. As shown in FIG. 13, the pouch 200 may be substantially square in shape to accommodate, for example, a sandwich, such as a grilled cheese sandwich or a meat and cheese sandwich. As shown in FIG. 14, the pouch 200 may be circular or rounded in shape to accommodate, for example, a pot pie.

In each of the exemplary packages shown in FIGS. 9-14, various closure mechanisms may be provided. For example, any of the closure mechanisms shown in or described in connection with FIGS. 1-8 may be used, including one or more adhesives strips (FIGS. 1, 2, 5, 6), flaps (FIGS. 3, 4, 5, 6), tabs (FIGS. 7, 8), zippers, which typically comprise at least one elongated ridge and at least one mating and releasably interlocking elongated groove (FIG. 14), sliders, which are zipper-type fasteners that typically include a sliding bar that causes the ridge(s) to engage with the groove(s) as the slider is moved along the opening (FIG. 13), or the like, or any combination thereof, as are known to those of skill in the art. Other closure mechanisms are contemplated hereby.

Any of the numerous packages contemplated hereby may be formed from one or more microwave energy interactive materials that promote browning and/or crisping of the food item during microwave heating. In one aspect, the package may include one or more susceptor materials. The susceptor material may form all or part of the package as needed or desired to brown or crisp the food item. Thus, for instance, where the package is intended for use with a slice of pizza, the susceptor material may form all or part of the portion of the package in contact with or proximate the crust of the pizza. As another example, where the package is intended for a sandwich or a burrito, substantially all of the interior surface of the package may be provided with a susceptor material.

A susceptor used in accordance with the present invention may comprise a microwave energy interactive material deposited on or supported by a substrate. Depending on the microwave energy interactive material selected and its positioning in the packaging, the susceptor may absorb microwave energy, transmit microwave energy, or reflect microwave energy as desired for a particular food product. When the food product is placed inside the package, the microwave energy interactive material may be in proximate contact with the surface of the food product, intimate contact with the food product, or a combination thereof, as needed to achieve the desired cooking results.

The microwave energy interactive material may comprise an electroconductive or semiconductive material. According to one aspect of the present invention, the microwave energy interactive material may comprise a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use with the present invention include, but are not limited to, aluminum, chromium, copper, inconel alloys (nickel-chromium-molybdenum alloy with niobium), iron, magnesium, nickel, stainless steel, tin, titanium, tungsten, and any combination thereof.

While metals are inexpensive and easy to obtain in both vacuum deposited or foil forms, metals may not be suitable for every application. For example, in high vacuum deposited thickness and in foil form, metals are opaque to visible light and may not be suitable for forming a clear microwave package or component. Further, the interactive properties of such vacuum deposited metals for heating often are limited to heating for narrow ranges of heat flux and temperature. Such materials therefore may not be optimal for heating, browning, and crisping all food products. Additionally, for field management uses, metal foils and vacuum deposited coatings can be difficult to handle and design into packages, and can lead to arcing at small defects in the structure.

Thus, according to another aspect of the present invention, the microwave interactive energy material may comprise a metal oxide. Examples of metal oxides that may be suitable for use with the present invention include, but are not limited to, oxides of aluminum, iron, and tin, used in conjunction with an electrically conductive material where needed. Another example of a metal oxide that may be suitable for use with the present invention is indium tin oxide (ITO). ITO can be used as a microwave energy interactive material to provide a heating effect, a shielding effect, or a combination thereof. To form the susceptor, ITO typically is sputtered onto a clear polymeric film. The sputtering process typically occurs at a lower temperature than the evaporative deposition process used for metal deposition. ITO has a more uniform crystal structure and, therefore, is clear at most coating thicknesses. Additionally, ITO can be used for either heating or field management effects. ITO also may have fewer defects than metals, thereby making thick coatings of ITO more suitable for field management than thick coatings of metals, such as aluminum.

Alternatively, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

The substrate used in accordance with the present invention typically comprises an electrical insulator, for example, a polymeric film. The thickness of the film may typically be from about 35 gauge to about 10 mil. In one aspect, the thickness of the film is from about 40 to about 80 gauge. In another aspect, the thickness of the film is from about 45 to about 50 gauge. In still another aspect, the thickness of the film is about 48 gauge. Examples of polymeric films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

According to one aspect of the present invention, the polymeric film may comprise polyethylene terephthalate. Examples of polyethylene terephthalate film that may be suitable for use as the substrate include, but are not limited to, MELINEX®, commercially available from DuPont Teijan Films (Hopewell, Va.), and SKYROL, commercially available from SKC, Inc. (Covington, Ga.). Polyethylene terephthalate films are used in commercially available susceptors, for example, the QWIK WAVE® Focus susceptor and the MICRO-RITE® susceptor, both available from Graphic Packaging International (Marietta, Ga.).

According to another aspect of the present invention, the package may be constructed from materials that provide a water bather, oxygen barrier, or a combination thereof to the susceptor. Such barrier layers may be formed from a polymer film having barrier properties or from any other barrier layer or coating as desired. Suitable polymer films may include, but are not limited to, ethylene vinyl alcohol, barrier nylon, polyvinylidene chloride, barrier fluoropolymer, nylon 6, nylon 6,6, coextruded nylon 6/EVOH/nylon 6, silicon oxide coated film, or any combination thereof.

One example of a barrier film that may be suitable for use with the present invention is CAPRAN® EMBLEM 1200M nylon 6, commercially available from Honeywell International (Pottsville, Pa.). Another example of a barrier film that may be suitable is CAPRAN® OXYSHIELD OBS monoaxially oriented coextruded nylon 6/ethylene vinyl alcohol (EVOH)/nylon 6, also commercially available from Honeywell International. Yet another example of a barrier film that may be suitable for use with the present invention is DARTEK® N-201 nylon 6,6, commercially available from Enhance Packaging Technologies (Webster, New York).

Still other barrier films include silicon oxide coated films, such as those available from Sheldahl Films (Northfield, Minn.). Thus, in one aspect, a susceptor may have a structure including a film, for example, polyethylene terephthalate, with a layer of silicon oxide coated onto the film, and ITO or other material deposited over the silicon oxide. If needed or desired, additional layers or coatings may be provided to shield the individual layers from damage during processing.

The barrier film may have an oxygen transmission rate (OTR) as measured using ASTM D3985 of less than about 20 cc/m²/day. In one aspect, the barrier film has an OTR of less than about 10 cc/m²/day. In another aspect, the barrier film has an OTR of less than about 1 cc/m²/day. In still another aspect, the barrier film has an OTR of less than about 0.5 cc/m²/day. In yet another aspect, the barrier film has an OTR of less than about 0.1 cc/m²/day.

The barrier film may have a water vapor transmission rate (WVTR) as measured using ASTM F1249. of less than about 100 g/m²/day. In one aspect, the barrier film has a WVTR of less than about 50 g/m²/day. In another aspect, the barrier film has a WVTR of less than about 15 g/m²/day. In yet another aspect, the barrier film has a WVTR of less than about 1 g/m²/day. In still another aspect, the barrier film has a WVTR of less than about 0.1 g/m²/day. In a still further aspect, the barrier film has a WVTR of less than about 0.05 g/m²/day.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food product. For example, the microwave energy interactive material may be provided as a continuous or discontinuous layer or coating, circles, loops, hexagons, islands, squares, rectangles, octagons, and so forth. Examples of alternative patterns and methods that may be suitable for use with the present invention are provided in U.S. Pat. Nos. 6,765,182; 6,717,121; 6,677,563; 6,552,315; 6,455,827; 6,433,322; 6,414,290; 6,251,451; 6,204,492; 6,150,646; 6,114,679; 5,800,724; 5,759,422; 5,672,407; 5,628,921; 5,519,195; 5,424,517; 5,410,135; 5,354,973; 5,340,436; 5,266,386; 5,260,537; 5,221,419; 5,213,902; 5,117,078; 5,039,364; 4,963,424; 4,936,935; 4,890,439; and 4,775,771; each of which is incorporated by reference herein in its entirety. Although particular examples of the microwave energy interactive material are shown and described herein, it should be understood that other patterns of microwave energy interactive material are contemplated by the present invention.

According to yet another aspect of the present invention, the susceptor optionally is laminated to a support. The support may form a partial or complete layer of the susceptor. The support may be formed from paper, paperboard, a low shrink polymer, or any other suitable material. Thus, for example, a metallized polymer film may be laminated to a paper, for example, a kraft paper, or alternatively, a low shrink polymer film, for example, a cast nylon 6 or nylon 6,6 film, or a coextruded film containing such polymers. One such material that may be suitable for use with the present invention is DARTEK, commercially available from DuPont Canada.

Where the support is paper, the paper may have a basis weight of about 15 to about 80 lbs/ream. In one aspect, the paper support has a basis weight of about 20 to about 60 lbs/ream. In another aspect, the paper support has a basis weight of about 25 lbs/ream. Where the support is paperboard, the support may have a thickness of about 8 to about 28 mils. In one aspect, the paperboard support has a thickness of about 10 to about 20 mils. In another aspect, the paperboard support has a thickness of about 13 mils.

If desired, the support may be coated or laminated with other materials to impart other properties, such as absorbency, repellency, opacity, color, printability, stiffness, or cushioning. Absorbent susceptors are described in U.S. Provisional Application Ser. No. 60/604,637, filed Aug. 25, 2004, incorporated herein by reference in its entirety. Additionally, the support may include graphics or indicia printed thereon. Where no additional support is present, the insulating material may act as a support for the susceptor, may be in direct contact with the susceptor, and/or may be affixed thereto thermally, adhesively, mechanically, or any combination thereof, as is shown and described herein.

In another aspect of the present invention, the package includes an insulating microwave material. As used herein, an "insulating microwave material" refers to any arrangement of layers, such as polyester layers, susceptor layers, polymer layers, paper layers, continuous and discontinuous adhesive layers, and patterned adhesive layers that provide an insulating effect. The package may include one or more susceptors, one or more expandable insulating cells, or a combination of susceptors and expandable insulating cells. Examples of materials that may be suitable, alone or in combination, include, but are not limited to, are QwikWave® Susceptor packaging material, QwikWave® Focus packaging material, Micro-Rite® packaging material, MicroFlex® Q packaging material, and QuiltWave™ Susceptor packaging material, each of which is commercially available from Graphic Packaging International, Inc. Any of such materials or other insulating materials may be used to form all or a portion of the packages shown in FIGS. 1-14 and FIGS. 21-23 or contemplated hereby.

In one aspect of the present invention, the insulating microwave material includes at least one susceptor. By using an insulating microwave material with a susceptor, more of the sensible heat generated by the susceptor is transferred to the surface of the food product rather than to the microwave oven environment. Without the insulating material, some or all the heat generated by the susceptor may be lost via conduction to the surrounding air and other conductive media, such as the microwave oven floor or turntable. Thus, more of the sensible heat generated by the susceptor is directed to the food product and browning and crisping is enhanced. Furthermore, insulating microwave materials may retain moisture in the food item when cooking in the microwave oven, thereby improving the texture and flavor of the food item.

Various exemplary insulating materials are depicted in FIGS. 15-20. In each of the examples shown herein, it should be understood that the layer widths are not necessarily shown to scale. In some instances, for example, the adhesive layers may be very thin with respect to other layers, but are nonetheless shown with some thickness for purposes of clearly illustrating the arrangement of layers.

Figure 15:
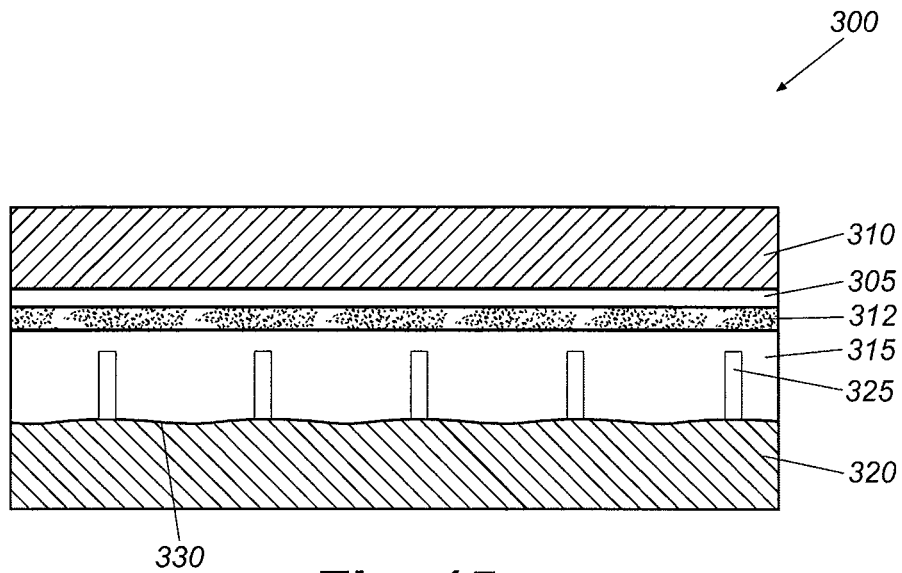
FIG. 15 is a cross-sectional view of an insulating microwave material that may be used in accordance with the present invention.

Referring to FIG. 15, the material 300 may be a combination of several different layers. A susceptor, which typically includes a thin layer of microwave interactive material 305 on a first plastic film 310, is bonded for example, by lamination with an adhesive 312, to a dimensionally stable substrate 315, for example, paper. The substrate 315 is bonded to a second plastic film 320 using a patterned adhesive 325 or other material, such that closed cells 330 are formed in the material 300. The closed cells 330 (shown unexpanded) are substantially resistant to vapor migration.

Figure 16:
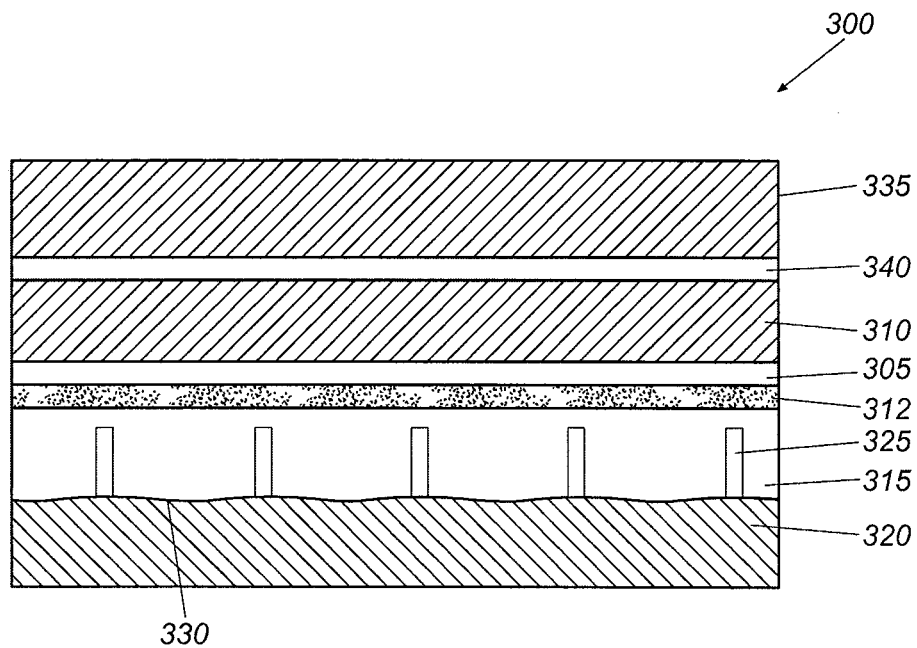
FIG. 16 is a cross-sectional view of an alternative insulating microwave material that may be used in accordance with the present invention.

Optionally, an additional substrate layer 335 may be adhered by adhesive 340 or otherwise to the first plastic film 310 opposite the microwave interactive material 305, as depicted in FIG. 16. The additional substrate layer 335 may be a layer of paper or any other suitable material, and may be provided to shield the food item (not shown) from any flakes of susceptor film that craze and peel away from the substrate during heating. The insulating material 300 provides a substantially flat, multi-layered sheet 350, as shown in FIG. 17.

Figure 17:
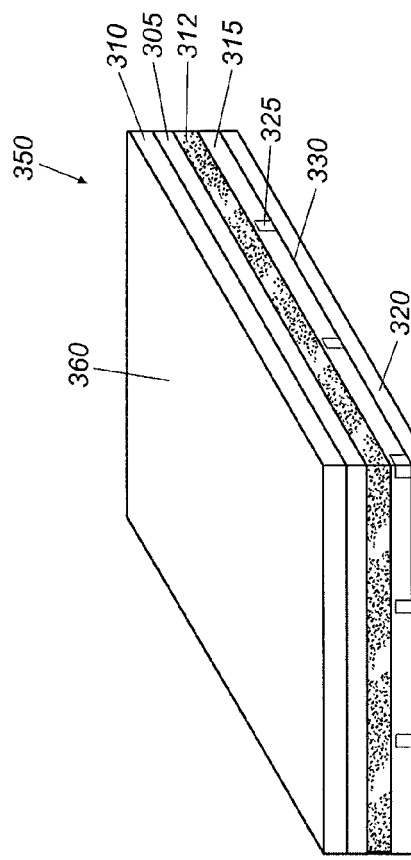
FIG. 17 is a perspective view of the insulating microwave material of FIG. 15.
Figure 18:
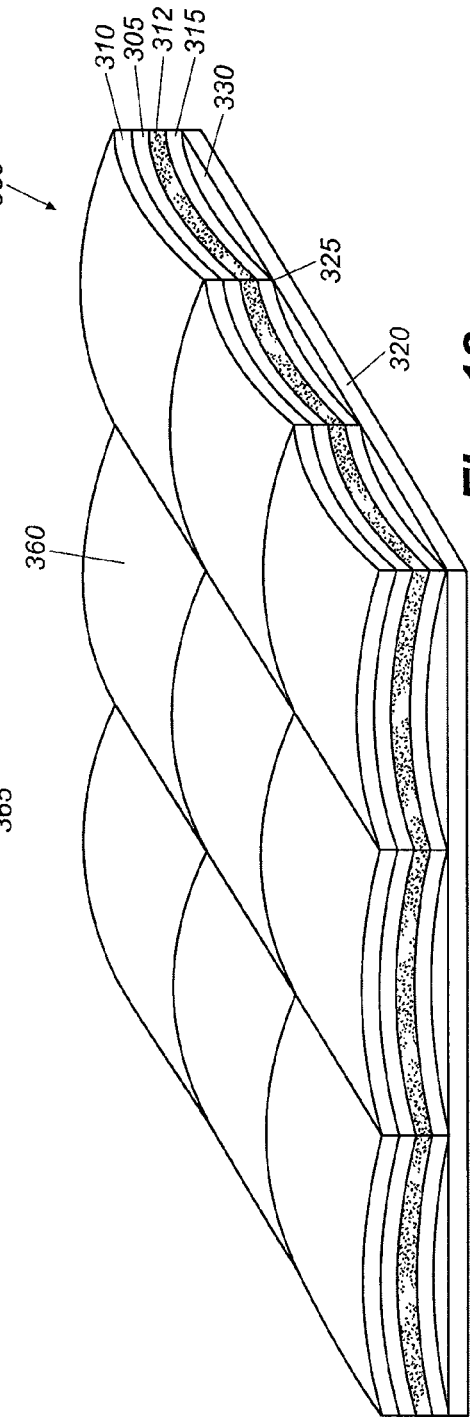
FIG. 18 depicts the insulating microwave material of FIG. 17 after exposure to microwave energy.

FIG. 18 depicts the exemplary insulating material 350 of FIG. 17 after being exposed to microwave energy from a microwave oven (not shown). As the susceptor heats upon impingement by microwave energy, water vapor and other gases normally held in the substrate 315, for example, paper, and any air trapped in the thin space between the second plastic film 320 and the substrate 315 in the closed cells 330, expand. The expansion of water vapor and air in the closed cells 330 applies pressure on the susceptor film 310 and the substrate 315 on one side and the second plastic film 320 on the other side of the closed cells 330. Each side of the material 300 forming the closed cells 330 reacts simultaneously, but uniquely, to the heating and vapor expansion. The cells 330 expand or inflate to form a quilted top surface 360 of cells separated by channels in the susceptor film 310 and substrate 315 lamination, which lofts above a bottom surface 365 formed by the second plastic film 320. This expansion may occur within 1 to 15 seconds in an energized microwave oven, and in some instances, may occur within 2 to 10 seconds.

Figure 19:
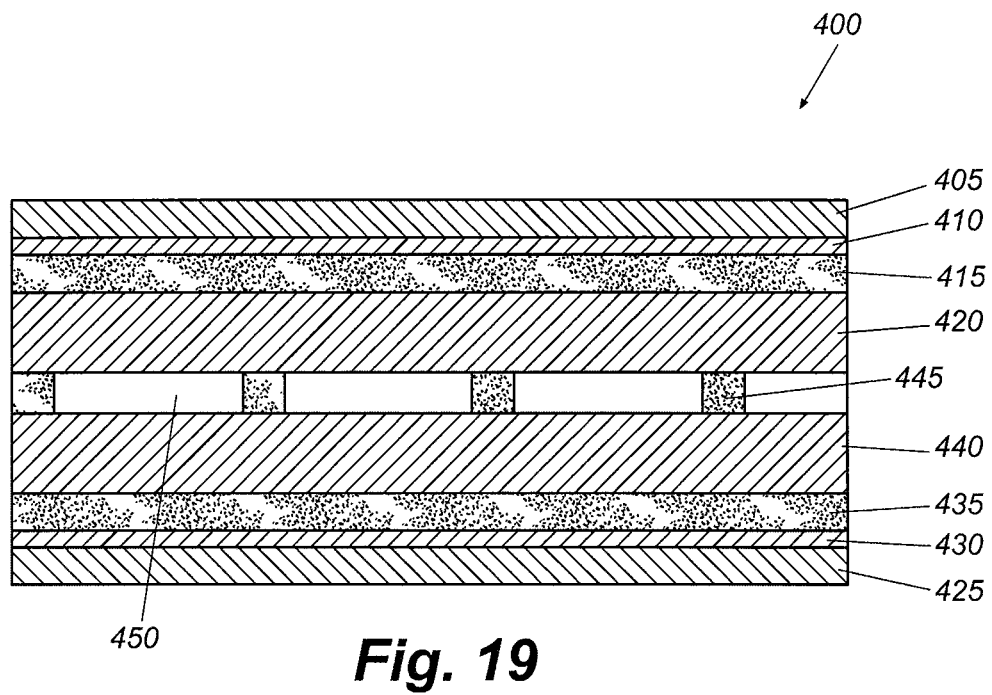
FIG. 19 is a cross-sectional view of yet another insulating microwave material that may be used in accordance with the present invention.
Figure 20:
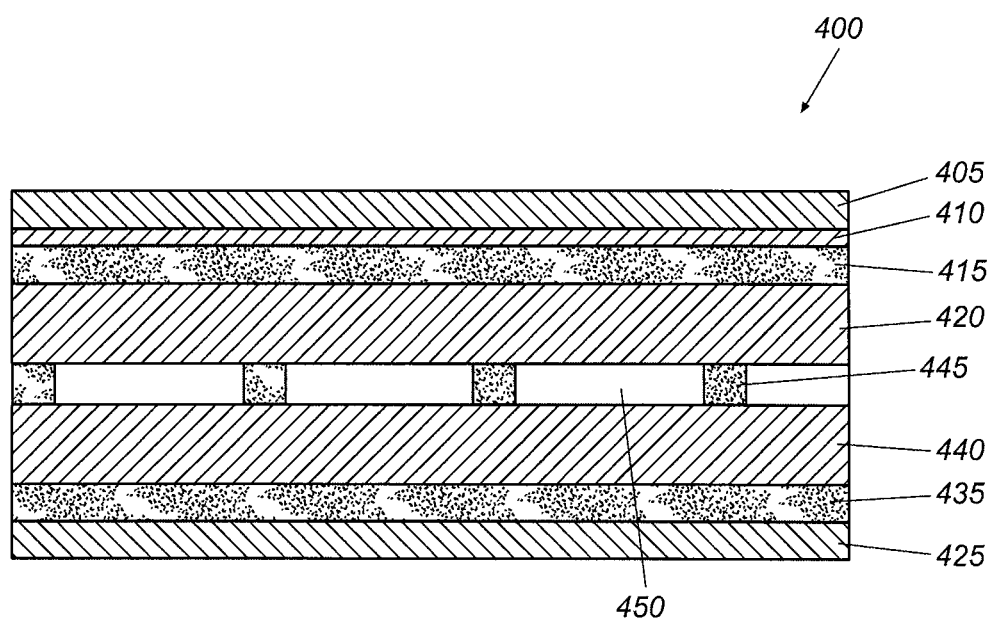
FIG. 20 is a cross-sectional view of still another insulating microwave material that may be used in accordance with the present invention.

FIGS. 19 and 20 depict alternative exemplary microwave insulating material layer configurations that may be suitable for use with any of the various packages of the present invention. Referring first to FIG. 19, an insulating microwave material 400 is shown with two symmetrical layer arrangements adhered together by a patterned adhesive layer. The first symmetrical layer arrangement, beginning at the top of the figure, comprises a PET film layer 405, a metal layer 410, an adhesive layer 415, and a paper or paperboard layer 420. The metal layer 410 may comprise a metal, such as aluminum, deposited along a portion or the entire PET film layer 405. The PET film 405 and metal layer 410 together define a susceptor. The adhesive layer 415 bonds the PET film 405 and the metal layer 410 to the paperboard layer 420.

The second symmetrical layer arrangement, beginning at the bottom of the drawings, also comprises a PET film layer 425, a metal layer 430, an adhesive layer 435, and a paper or paperboard layer 440. If desired, the two symmetrical arrangements may be formed by folding one layer arrangement onto itself. The layers of the second symmetrical layer arrangement are bonded together in a similar manner as the layers of the first symmetrical arrangement. A patterned adhesive layer 445 is provided between the two paper layers 420 and 440, and defines a pattern of closed cells 450 configured to expand when exposed to microwave energy. In one aspect, an insulating material 300 having two metal layers 410 and 430 according to the present invention generates more heat and greater cell loft.

Referring to FIG. 20, yet another insulating microwave material 400 is shown. The material 400 may include a PET film layer 405, a metal layer 410, an adhesive layer 415, and a paper layer 420. Additionally, the material 400 may include a clear PET film layer 425, an adhesive 435, and a paper layer 440. The layers are adhered or affixed by a patterned adhesive 445 defining a plurality of closed expandable cells 450.

Any of the insulating materials shown herein or contemplated hereby may have barrier properties that render the package suitable for storage of a food item therein. Such insulating materials may include a layer of barrier film in addition to the other layers present, or may replace a film layer previously described herein. Various exemplary barrier films that may be suitable for use with the present invention are described above.

Figure 21:
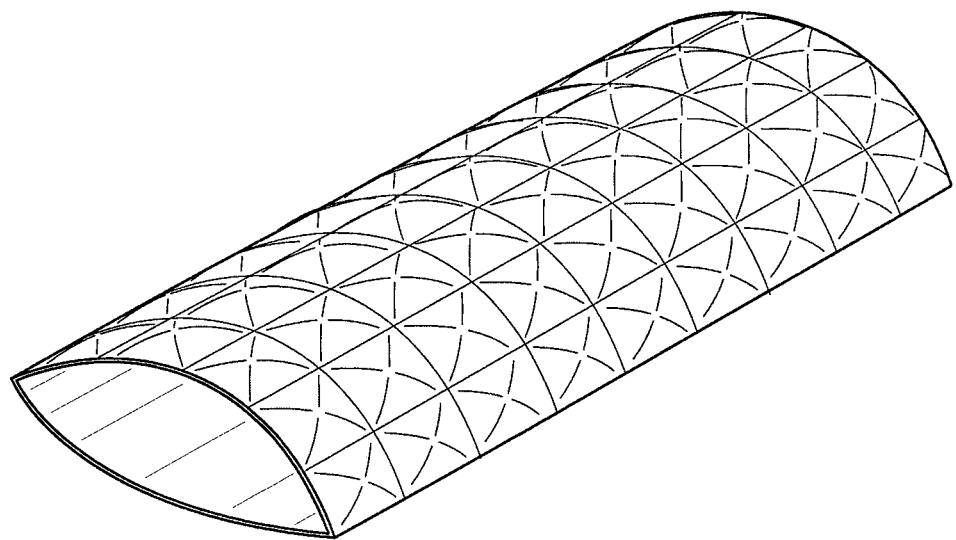
FIG. 21 depicts the package of FIG. 1 formed from an insulating microwave material, after exposure to microwave energy.
Figure 22:
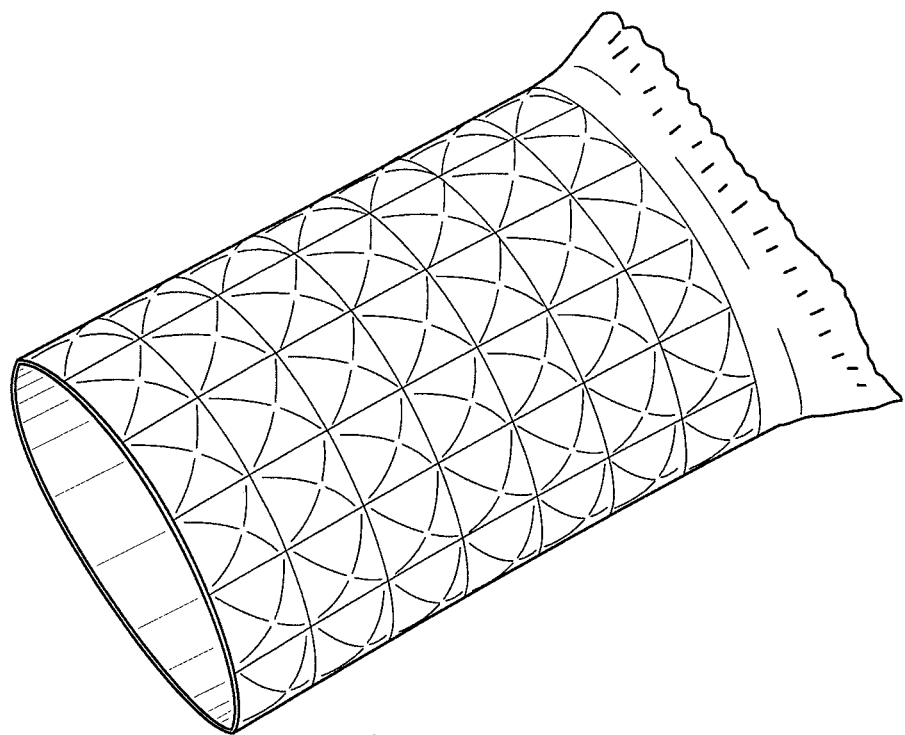
FIG. 22 depicts the package of FIG. 9 formed from an insulating microwave material, after exposure to microwave energy.
Figure 23:
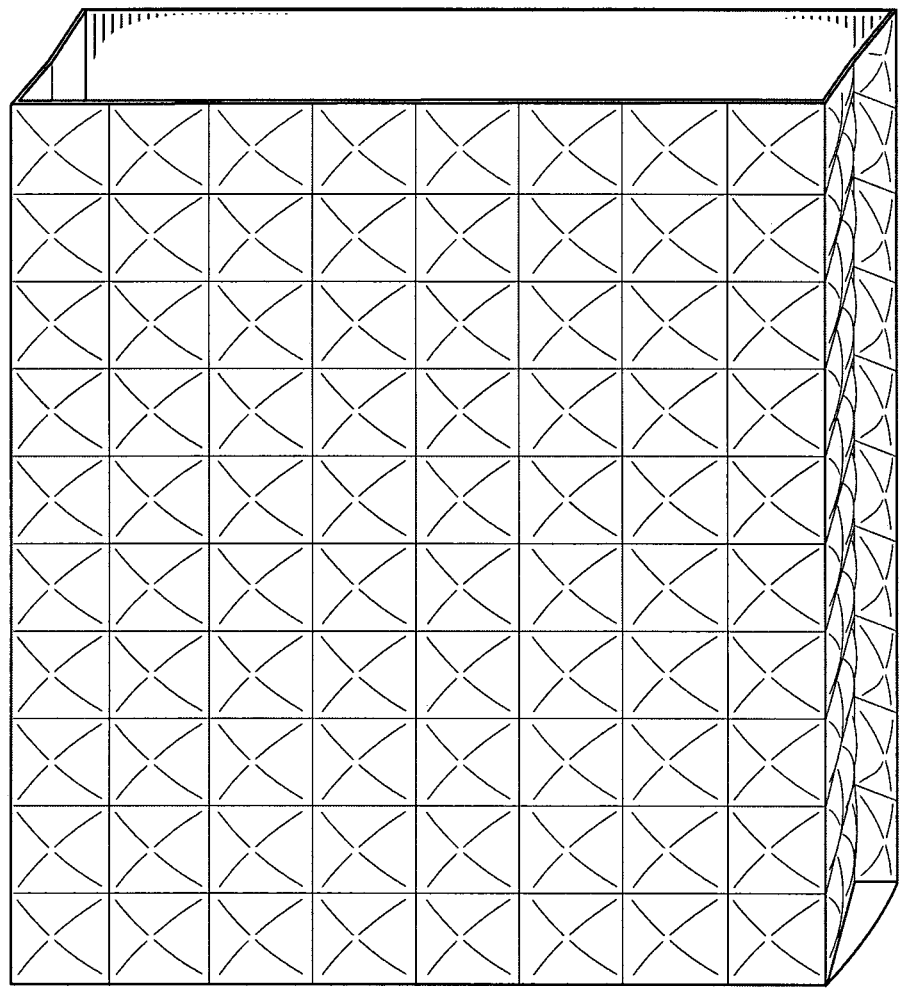
FIG. 23 depicts the package of FIG. 10 formed from an insulating microwave material, after exposure to microwave energy.

As stated above, any of such insulating materials may be used to form all or part of the various packages contemplated by the present invention. Thus, for example, FIG. 21 depicts the package of FIG. 1 formed from an insulating material, FIG. 22 depicts the package of FIG. 7 formed from an insulating material, and FIG. 23 depicts the package of FIG. 8 formed from an insulating material, where each of FIGS. 1, 9, and 10 illustrate the package upon exposure to microwave energy.

It should be understood that in any of the packages contemplated hereby, it may be necessary or desirable to configure the package to include portions formed from a material other than an insulating material. For example, in one aspect, a package includes a food-supporting surface formed from a susceptor material, and a food-covering layer formed from an insulating microwave material. Such a package may be useful with food items that have a crust that is desirably browned and crisped, for example, pizza. Likewise, the package may include portions, for example, proximate the edges or the opening that do not have an insulating effect. Thus, for example, the package may be designed to have the flap, zipper, or other closure mechanism attached or affixed to a non-insulating material. In yet another aspect, one or more portions of the package may be laminated or otherwise bonded or assembled or assembled so that portions of the package formed from an insulating material are rendered non-insulating. For example, an insulating material having expandable cells used to form a sleeve may be bonded around all or a portion of the periphery so that the expandable cells can no longer expand. As another example, the package may include portions that include expanding cells that are positioned to maintain the package in an upright position, a flattened position, or any other configuration during cooking. Thus, advantageously, numerous packages may be tailored to various food items to optimize heating in the microwave oven.

Use of any of the exemplary insulating materials to package and/or cook a food item provides several benefits before, during, and after heating in a microwave oven. First, the water vapor and air contained in the closed cells provides insulation between the food item and the interior surfaces of the microwave oven. The base of a microwave oven, for example, the glass tray found in most microwave ovens, acts as a large heat sink, absorbing much of the heat generated by the susceptor film or within the food item itself. The vapor pockets in the cells formed by the present invention may be used to insulate the food item and susceptor film from the microwave oven surfaces and the vented air in the microwave oven cavity, thereby increasing the amount of heat that stays within or is transferred to the food item.

Second, the formation of the cells allows the material to conform more closely to the surface of the food item, placing the susceptor film in greater proximity to the food item. This enhances the ability of the susceptor film to brown and crisp the surface of the food item by conduction heating, in addition to some convection heating, of the food item.

Further, the insulating materials contemplated hereby may be desirable as a packaging material because it adds little bulk to the finished package, yet is transformed into a bulk insulating material without any consumer preparation before cooking.

The user then may dispense or otherwise remove a cooking package from the bag or carton, and place a food item to be cooked into the interior thereof. The package may be sealed by any of various mechanisms, for example, those described above, and placed in the refrigerator, freezer, lunch bag, briefcase, or otherwise, for later use. For example, the food item may be placed in the refrigerator for later consumption by another family member, such as a spouse or child. When the user wants to consume the food item, the packaged optionally is opened for venting (as described above) and the package is placed in the microwave oven. After heating, the food item may be removed from the package if desired. Alternatively, the food item may be consumed while still in the package, and the package may gradually be pulled away from the food item to expose it. If desired, the package may be provided with tear lines or perforations to aid in removal of the food item from the package.

The present invention is illustrated further by the following examples, which are not to be construed in any way as imposing limitations upon the scope thereof. On the contrary, it is to be clearly understood that resort may be had to various other aspects, modifications, and equivalents thereof which, after reading the description herein, may be suggested to one of ordinary skill in the art without departing from the spirit of the present invention or the scope of the appended claims.

EXAMPLE 1

The conductivity of various susceptor films was evaluated. Indium tin oxide coated (ITO) films were provided by Sheldahl Films (Northfield, Minn.) for evaluation, as indicated in Table 1. Each of the films included one or more layers of a proprietary clear hard coat ("CLHC") material to protect the individual layers. The films were laminated on the ITO side to 75 gauge DARTEK N-201 nylon 6,6 film using Rohm & Haas Mor-Free 205A/C-66 adhesive applied in an amount of about 1.2 lb/ream. A 48-gauge polyethylene terephthalate (PET) film was evaluated as a control material. The results are presented in Table 1.

TABLE 1

| Sample | Sheldahl No. | Construction | No. of Samples | Conductivity (mhos/sq) | Resistivity (ohms/sq) |
|---|---|---|---|---|---|
| 1 | 140669 | 40 ohm/sq ITO 2 mil PET | 9 | 0.014 to 0.026 | 71.4 to 38.4 |
| 2 | 159512 | 250 ohm/sq ITO SiOx CLHC 7.5 mil PET CLHC | 4 | 0.0036 to 0.0037 | 277.8 to 270.3 |
| 3 | 159980 | 50 ohm/sq ITO SiOx CLHC 7.5 mil PET CLHC | 9 | 0.0166 to 0.0173 | 60.2 to 57.8 |
| 4 | control | 48 gauge PET | 1 | 0.016 to 0.017 | 62.5 to 58.8 |

According to one aspect of the present invention, a plurality of microwave cooking packages are provided in a nestled, stacked, folded, rolled, or other configuration. Thus, for example, a plurality of packages may be stacked in a face-to-face relation, then folded or rolled and placed in a bag, box, or other carton. The carton may include a portion that tears away using perforations, folds, tabs, or otherwise, to form an open portion through which the microwave cooking packages may be removed or dispensed.

The results indicate that the ITO films form susceptor materials that may be useful to form packages of the present invention. The use of a 7.5 mil PET film may be desirable for packaging applications that require or benefit from some level of stiffness or rigidity. However, it will be understood that ITO may be used to form susceptor materials having a lower basis weight and, therefore, less rigidity, as needed or desired for flexible packaging applications.

EXAMPLE 2

The barrier properties of Samples 2 and 3 from Example 1, each including a silicon oxide (SiOx) barrier layer, also were evaluated. Oxygen Transmission Rate (OTR) was measured at 22.8° C. and 0% relative humidity. Water Vapor Transmission Rate (WVTR) was measured at 37.8° C. and 100% relative humidity. The results are presented in Table 2 The results indicate that a SiOx layer may be used successfully to prepare a barrier susceptor suitable for use with the present invention.

TABLE 2

| Sample | Sheldahl No. | Construction | No. of Samples | OTR (cc/m²/day) | WVTR (g/m²/day) |
|---|---|---|---|---|---|
| 2 | 159512 | 250 ohm/sq ITO SiOx CLHC 7.5 mil PET CLHC | 4 | <0.0496 | 0.0841 |
| 3 | 159980 | 50 ohm/sq ITO SiOx CLHC 7.5 mil PET CLHC | 9 | <0.0496 | 0.0143 |

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

While the present invention is described herein in detail in relation to specific aspects, it is to be understood that this detailed description is only illustrative and exemplary of the present invention and is made merely for purposes of providing a full and enabling disclosure of the present invention. The detailed description set forth herein is not intended nor is to be construed to limit the present invention or otherwise to exclude any such other embodiments, adaptations, variations, modifications, and equivalent arrangements of the present invention, the present invention being limited solely by the claims appended hereto and the equivalents thereof.

What is claimed is:

1. A microwave energy interactive structure comprising a layer of indium tin oxide supported on a microwave energy transparent substrate, wherein the microwave energy interactive structure has at least one of:
   an oxygen transmission rate of less than about 0.05 cc/m²/day, and
   a water vapor transmission rate of less than about 0.09 g/m²/day.

2. The microwave energy interactive structure of claim 1, wherein the layer of indium tin oxide is sufficiently thin so that the layer of indium tin oxide is operative for converting at least a portion of impinging microwave energy to thermal energy.

3. The microwave energy interactive structure of claim 1, wherein the microwave energy interactive structure has a resistivity of from about 38 to about 71 ohms/square.

4. The microwave energy interactive structure of claim 1, wherein the microwave energy interactive structure has a resistivity of from about 57 to about 60 ohms/square.

5. The microwave energy interactive structure of claim 1, wherein the microwave energy interactive structure has a resistivity of from about 270 to about 277 ohms/square.

6. The microwave energy interactive structure of claim 1, wherein the microwave energy interactive structure has a resistivity of at least about 270 ohms/square.

7. The microwave energy interactive structure of claim 1, wherein the microwave energy transparent substrate is selected from the group consisting of a polymer film, paper, paperboard, and any combination thereof.

8. The microwave energy interactive structure of claim 1, wherein the microwave energy transparent substrate is substantially colorless and substantially transparent.

9. The microwave energy interactive structure of claim 1, wherein the microwave energy transparent substrate comprises polyethylene terephthalate.

10. The microwave energy interactive structure of claim 1, wherein the microwave energy transparent substrate comprises a barrier film selected from the group consisting of ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, and any combination thereof.

11. The microwave energy interactive structure of claim 1, wherein the microwave energy interactive structure has a water vapor transmission rate of about 0.01 g/m²/day.

12. The microwave energy interactive structure of claim 1, wherein
   the microwave energy transparent substrate comprises a first polymer film layer, and
   the microwave energy interactive structure further comprises
      a moisture-containing layer joined to the layer of indium tin oxide, and
      a second polymer film layer joined to the moisture-containing layer in a predetermined pattern, thereby forming a plurality of expandable cells between the moisture-containing layer and the second polymer film layer.

13. The microwave energy interactive structure of claim 12, wherein at least some of the expandable cells are operative for inflating in response to microwave energy.

14. The microwave energy interactive structure of claim 12, wherein at least one of the first polymer film layer and the second polymer film layer comprises a barrier film selected from the group consisting of ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, and any combination thereof.

15. A microwave energy interactive structure consisting essentially of a layer of indium tin oxide supported on a microwave energy transparent substrate, in combination with a support layer, wherein the support layer is joined to the layer of indium tin oxide so that the support layer and the layer of indium tin oxide are in a facing relationship, wherein at least one of the substrate and the support layer comprises a barrier film comprising silicon oxide coated polyethylene terephthalate.

16. The microwave energy interactive structure of claim 15, wherein the layer of indium tin oxide is operative for converting at least a portion of impinging microwave energy to thermal energy.

17. The microwave energy interactive structure of claim 1, further comprising a support layer joined to the layer of indium tin oxide so that the support layer and the layer of indium tin oxide are in a facing relationship, wherein the support layer comprises a polymer film, paper, paperboard, or any combination thereof.

18. The microwave energy interactive structure of claim 17, wherein the support layer comprises a barrier film selected from the group consisting of ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, and any combination thereof.

19. The microwave energy interactive structure of claim 18, wherein the silicon oxide coated film comprises silicon oxide coated polyethylene terephthalate.

20. The microwave energy interactive structure of claim 1, wherein the microwave energy interactive structure forms at least a portion of a package.

21. The microwave energy interactive structure of claim 20, wherein the portion of the package is substantially optically transparent.

22. The microwave energy interactive structure of claim 1, in combination with a food item having a surface that is desirably at least one of browned and crisped.

23. A method of using the combination of claim 22, comprising exposing the food item and microwave energy interactive structure to microwave energy, so that the layer of indium tin oxide converts at least a portion of the microwave energy to heat and at least one of browns and crisps the surface of the food item.

24. The microwave energy interactive structure of claim 15, wherein the microwave energy interactive structure has a resistivity of from about 38 to about 71 ohms/square.

25. The microwave energy interactive structure of claim 15, wherein the microwave energy interactive structure has a resistivity of from about 57 to about 60 ohms/square.

26. The microwave energy interactive structure of claim 15, wherein the microwave energy interactive structure has a resistivity of about 250 ohms/square.

27. The microwave energy interactive structure of claim 15, wherein the microwave energy interactive structure has a resistivity of from about 270 to about 277 ohms/square.

28. The microwave energy interactive structure of claim 15, wherein the microwave energy interactive structure has a resistivity of at least about 270 ohms/square.

29. The combination of claim 15, wherein the substrate and the support layer each independently comprise a polymer film, paper, paperboard, or any combination thereof.

30. The combination of claim 15, wherein at least one of the substrate and the support layer comprises polyethylene terephthalate.

31. The combination of claim 15, having an oxygen transmission rate of less than about 0.05 cc/m$^2$/day.

32. The combination of claim 15, having a water vapor transmission rate of less than about 0.09 g/m$^2$/day.

33. The combination of claim 15, having a water vapor transmission rate of about 0.08 g/m$^2$/day.

34. The combination of claim 15, having a water vapor transmission rate of about 0.01 g/m$^2$/day.

35. The combination of claim 15, in combination with a polymer film layer, wherein the polymer film layer is joined to the support layer in a patterned configuration that defines a plurality of closed cells between the support layer and the polymer film layer, wherein the closed cells are operative for inflating in response to microwave energy.

36. The microwave energy interactive structure of claim 35, wherein the polymer film layer comprises polyethylene terephthalate, ethylene vinyl alcohol, bather nylon, polyvinylidene chloride, bather fluoropolymer, nylon 6, nylon 6,6, coextruded nylon 6/ethylene vinyl alcohol/nylon 6, silicon oxide coated film, or any combination thereof.

37. The microwave energy interactive structure of claim 15, wherein the microwave energy interactive structure is at least one of substantially colorless and substantially optically transparent.

38. The microwave energy interactive structure of claim 15, wherein the microwave energy interactive structure comprises at least a portion of a package.

39. The microwave energy interactive structure of claim 38, wherein the portion of the package is at least one of substantially colorless and substantially optically transparent.

40. The microwave energy interactive structure of claim 15, in combination with a food item having a surface that is desirably at least one of browned and crisped.

41. A method of using the combination of claim 40, comprising exposing the food item and microwave energy interactive structure to microwave energy so that the layer of indium tin oxide converts at least a portion of the microwave energy to heat and at least one of browns and crisps the surface of the food item.

42. A microwave energy interactive structure comprising:
    a first polymer film layer and a second polymer film layer, wherein at least one of the first polymer film and the second polymer film comprises a silicon oxide coated polyethylene terephthalate film; and
    a layer of indium tin oxide disposed between the first polymer film layer and the second polymer film layer.

43. The microwave energy interactive structure of claim 42, wherein the layer of indium tin oxide is operative for converting at least a portion of microwave energy into thermal energy.

44. The microwave energy interactive structure of claim 42, wherein the microwave energy interactive structure has a resistivity of from about 38 to about 71 ohms/square.

45. The microwave energy interactive structure of claim 42, wherein the microwave energy interactive structure has a resistivity of about 40 ohms/square.

46. The microwave energy interactive structure of claim 42, wherein the microwave energy interactive structure has a resistivity of about 50 ohms/square.

47. The microwave energy interactive structure of claim 42, wherein the microwave energy interactive structure has a resistivity of from about 57 to about 60 ohms/square.

48. The microwave energy interactive structure of claim 42, wherein the microwave energy interactive structure has a resistivity of about 250 ohms/square.

49. The microwave energy interactive structure of claim 42, wherein the microwave energy interactive structure has a resistivity of from about 270 to about 277 ohms/square.

50. The microwave energy interactive structure of claim 42, wherein the microwave energy interactive structure has a resistivity of at least about 270 ohms/square.

51. The microwave energy interactive structure of claim 42, wherein at least one of the first polymer film and the second polymer film comprises polyethylene terephthalate.

52. The microwave energy interactive structure of claim 42, wherein at least one of the first polymer film and the second polymer film comprises a barrier film.

53. The microwave energy interactive structure of claim 52, wherein the barrier film comprises ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, or any combination thereof.

54. The microwave energy interactive structure of claim 42, wherein the first polymer film comprises the silicon oxide coated polyethylene terephthalate and the second polymer film comprises nylon 6,6.

55. The microwave energy interactive structure of claim 42, wherein the microwave energy interactive structure has an oxygen transmission rate of less than about 0.05 cc/ m$^2$/day.

56. The microwave energy interactive structure of claim 42, wherein the microwave energy interactive structure has a water vapor transmission rate of less than about 0.09 g/m$^2$/day.

57. The microwave energy interactive structure of claim 42, wherein the microwave energy interactive structure has a water vapor transmission rate of about 0.08 g/m$^2$/day.

58. The microwave energy interactive structure of claim 42, wherein the microwave energy interactive structure has a water vapor transmission rate of about 0.01 g/m$^2$/day.

59. The microwave energy interactive structure of claim 42, wherein at least one of the first polymer film and the second polymer film has a thickness of from about 35 gauge to about 10 mil.

60. The microwave energy interactive structure of claim 42, further comprising a third polymer film layer joined to the second polymer film layer in a predetermined pattern, thereby forming a plurality of expandable cells between the second polymer film layer and the third polymer film layer, wherein the expandable cells are operative for inflating in response to microwave energy.

61. The microwave energy interactive structure of claim 60, wherein the third polymer film layer comprises polyethylene terephthalate, ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, or any combination thereof.

62. The microwave energy interactive structure of claim 42, wherein the microwave energy interactive structure is at least one of substantially colorless and substantially optically transparent.

63. The microwave energy interactive structure of claim 42, wherein the microwave energy interactive structure comprises at least a portion of a package.

64. The microwave energy interactive structure of claim 63, wherein the portion of the package is at least one of substantially colorless and substantially optically transparent.

65. The microwave energy interactive structure of claim 42, in combination with a food item having a surface that is desirably at least one of browned and crisped.

66. A method of using the combination of claim 65, comprising exposing the food item and microwave energy interactive structure to microwave energy so that the layer of indium tin oxide converts at least a portion of the microwave energy to heat and at least one of browns and crisps the surface of the food item.

67. A microwave energy interactive structure comprising a layer of indium tin oxide supported on a microwave energy transparent substrate, wherein
the microwave energy transparent substrate comprises a first polymer film layer, and
the microwave energy interactive structure further comprises
a moisture-containing layer joined to the layer of indium tin oxide, and
a second polymer film layer joined to the moisture-containing layer in a predetermined pattern, thereby forming a plurality of expandable cells between the moisture-containing layer and the second polymer film layer.

68. The microwave energy interactive structure of claim 67, wherein at least some of the expandable cells are operative for inflating in response to microwave energy.

69. The microwave energy interactive structure of claim 67, wherein at least one of the first polymer film layer and the second polymer film layer comprises polyethylene terephthalate, ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, or any combination thereof.

70. The microwave energy interactive structure of claim 67, wherein the microwave energy interactive structure has at least one of
an oxygen transmission rate of less than about 20 cc/m$^2$/day, and
a water vapor transmission rate of less than about 100 g/m$^2$/day.

71. The microwave energy interactive structure of claim 67, wherein the microwave energy interactive structure has at least one of
an oxygen transmission rate of less than about 10 cc/m$^2$/day, and
a water vapor transmission rate of less than about 50 g/m$^2$/day.

72. The microwave energy interactive structure of claim 67, wherein the microwave energy interactive structure has at least one of
an oxygen transmission rate of less than about 1 cc/m$^2$/day, and
a water vapor transmission rate of less than about 15 g/m$^2$/day.

73. The microwave energy interactive structure of claim 67, wherein the microwave energy interactive structure has at least one of
an oxygen transmission rate of less than about 0.5 cc/m$^2$/day, and
a water vapor transmission rate of less than about 1 g/m$^2$/day.

74. The microwave energy interactive structure of claim 67, wherein the microwave energy interactive structure has at least one of
an oxygen transmission rate of less than about 0.1 cc/m$^2$/day, and
a water vapor transmission rate of less than about 0.1 g/m$^2$/day.

75. The microwave energy interactive structure of claim 67, wherein
the microwave energy interactive structure comprises at least a portion of a package, and
the portion of the package comprising the microwave energy interactive structure is at least one of substantially colorless and substantially optically transparent.

76. A microwave energy interactive structure comprising:
a layer of indium tin oxide supported on a microwave energy transparent substrate; and
a support layer joined to the layer of indium tin oxide so that the support layer and the layer of indium tin oxide are in a facing relationship, wherein the support layer comprises silicon oxide coated polyethylene terephthalate.

77. The microwave energy interactive structure of claim 76, wherein the microwave energy interactive structure has at least one of an oxygen transmission rate of less than about 20 cc/m²/day, and
a water vapor transmission rate of less than about 100 g/m²/day.

78. The microwave energy interactive structure of claim 76, wherein the microwave energy interactive structure has at least one of
an oxygen transmission rate of less than about 10 cc/m²/day, and
a water vapor transmission rate of less than about 50 g/m²/day.

79. The microwave energy interactive structure of claim 76, wherein the microwave energy interactive structure has at least one of
an oxygen transmission rate of less than about 1 cc/m²/day, and
a water vapor transmission rate of less than about 15 g/m²/day.

80. The microwave energy interactive structure of claim 76, wherein the microwave energy interactive structure has at least one of
an oxygen transmission rate of less than about 0.5 cc/m²/day, and
a water vapor transmission rate of less than about 1 g/m²/day.

81. The microwave energy interactive structure of claim 76, wherein the microwave energy interactive structure has at least one of
an oxygen transmission rate of less than about 0.1 cc/m²/day, and
a water vapor transmission rate of less than about 0.1 g/m²/day.

82. The microwave energy interactive structure of claim 76, wherein the microwave energy interactive structure has at least one of
an oxygen transmission rate of less than about 0.05 cc/m²/day, and
a water vapor transmission rate of less than about 0.09 g/m²/day.

83. The microwave energy interactive structure of claim 76, wherein the microwave energy interactive structure has a resistivity of from about 38 to about 71 ohms/square.

84. The microwave energy interactive structure of claim 76, wherein the microwave energy interactive structure has a resistivity of from about 270 to about 277 ohms/square.

85. The microwave energy interactive structure of claim 76, wherein the microwave energy transparent substrate comprises a nylon film having a thickness of from about 35 gauge to about 10 mil.

86. The microwave energy interactive structure of claim 76, wherein the microwave energy interactive structure is at least one of substantially colorless and substantially optically transparent.

87. The microwave energy interactive structure of claim 76, wherein the microwave energy interactive structure comprises at least a portion of a package.

88. The microwave energy interactive structure of claim 87, wherein the portion of the package is at least one of substantially colorless and substantially optically transparent.

89. A microwave energy interactive structure consisting essentially of:
a layer of indium tin oxide supported on a microwave energy transparent substrate, in combination with a support layer, wherein the support layer is joined to the layer of indium tin oxide so that the support layer and the layer of indium tin oxide are in a facing relationship with one another,
wherein
at least one of the substrate and the support layer comprises a barrier film, and
the microwave energy interactive structure has at least one of
an oxygen transmission rate of less than about 0.05 cc/m²/day, and
a water vapor transmission rate of less than about 0.09 g/m²/day.

90. The microwave energy interactive structure of claim 89, wherein the microwave energy interactive structure has a resistivity of from about 38 to about 71 ohms/square.

91. The microwave energy interactive structure of claim 89, wherein the microwave energy interactive structure has a resistivity of from about 270 to about 277 ohms/square.

92. The microwave energy interactive structure of claim 89, wherein the barrier film comprises ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, or any combination thereof.

93. The microwave energy interactive structure of claim 89, wherein
the microwave energy interactive structure comprises at least a portion of a package, and
the portion of the package comprising the microwave energy interactive structure is at least one of substantially colorless and substantially optically transparent.

94. A microwave energy interactive structure consisting essentially of:
a layer of indium tin oxide supported on a microwave energy transparent substrate, in combination with a support layer and a polymer film layer,
wherein
the support layer is joined to the layer of indium tin oxide so that the support layer and the layer of indium tin oxide are in a facing relationship, wherein at least one of the substrate and the support layer comprises a barrier film, and
the polymer film layer is joined to the support layer in a patterned configuration that defines a plurality of closed cells between the support layer and the polymer film layer, wherein the closed cells are operative for inflating in response to microwave energy.

95. The microwave energy interactive structure of claim 94, wherein the barrier film comprises polyethylene terephthalate, ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, or any combination thereof.

96. The microwave energy interactive structure of claim 94, wherein the microwave energy interactive structure has at least one of
an oxygen transmission rate of less than about 20 cc/m²/day, and
a water vapor transmission rate of less than about 100 g/m²/day.

97. The microwave energy interactive structure of claim 94, wherein the microwave energy interactive structure has at least one of
an oxygen transmission rate of less than about 10 cc/m²/day, and
a water vapor transmission rate of less than about 50 g/m²/day.

98. The microwave energy interactive structure of claim 94, wherein the microwave energy interactive structure has at least one of
an oxygen transmission rate of less than about 1 cc/m²/day, and
a water vapor transmission rate of less than about 15 g/m²/day.

99. The microwave energy interactive structure of claim 94, wherein the microwave energy interactive structure has at least one of
an oxygen transmission rate of less than about 0.5 cc/m²/day, and
a water vapor transmission rate of less than about 1 g/m²/day.

100. The microwave energy interactive structure of claim 94, wherein the microwave energy interactive structure has at least one of
an oxygen transmission rate of less than about 0.1 cc/m²/day, and
a water vapor transmission rate of less than about 0.1 g/m²/day.

101. The microwave energy interactive structure of claim 94, wherein the microwave energy interactive structure has at least one of
an oxygen transmission rate of less than about 0.05 cc/m²/day, and
a water vapor transmission rate of less than about 0.09 g/m²/day.

102. The microwave energy interactive structure of claim 94, wherein the microwave energy interactive structure has a resistivity of from about 38 to about 71 ohms/square.

103. The microwave energy interactive structure of claim 94, wherein the microwave energy interactive structure has a resistivity of from about 270 to about 277 ohms/square.

104. The microwave energy interactive structure of claim 94, wherein the microwave energy interactive structure comprises at least a portion of a package, and optionally, the portion of the package comprising the microwave energy interactive structure is at least one of substantially colorless and substantially optically transparent.

105. A microwave energy interactive structure comprising:
a first polymer film layer and a second polymer film layer, wherein
the first polymer film comprises polyethylene terephthalate or silicon oxide coated polyethylene terephthalate, and
the second polymer film comprises nylon 6,6; and
a layer of indium tin oxide disposed between the first polymer film layer and the second polymer film layer.

106. The microwave energy interactive structure of claim 105, wherein the microwave energy interactive structure has a resistivity of from about 38 to about 71 ohms/square.

107. The microwave energy interactive structure of claim 105, wherein the microwave energy interactive structure has a resistivity of from about 270 to about 277 ohms/square.

108. The microwave energy interactive structure of claim 105, wherein the microwave energy interactive structure has at least one of
an oxygen transmission rate of less than about 20 cc/m²/day, and
a water vapor transmission rate of less than about 100 g/m²/day.

109. The microwave energy interactive structure of claim 105, wherein the microwave energy interactive structure has at least one of
an oxygen transmission rate of less than about 10 cc/m²/day, and
a water vapor transmission rate of less than about 50 g/m²/day.

110. The microwave energy interactive structure of claim 105, wherein the microwave energy interactive structure has at least one of
an oxygen transmission rate of less than about 1 cc/m²/day, and
a water vapor transmission rate of less than about 15 g/m²/day.

111. The microwave energy interactive structure of claim 105, wherein the microwave energy interactive structure has at least one of
an oxygen transmission rate of less than about 0.5 cc/m²/day, and
a water vapor transmission rate of less than about 1 g/m²/day.

112. The microwave energy interactive structure of claim 105, wherein the microwave energy interactive structure has at least one of
an oxygen transmission rate of less than about 0.1 cc/m²/day, and
a water vapor transmission rate of less than about 0.1 g/m²/day.

113. The microwave energy interactive structure of claim 105, wherein the microwave energy interactive structure has at least one of
an oxygen transmission rate of less than about 0.05 cc/m²/day, and
a water vapor transmission rate of less than about 0.08 g/m²/day.

114. The microwave energy interactive structure of claim 105, wherein the microwave energy interactive structure comprises at least a portion of a package.

115. A microwave energy interactive structure comprising:
a first polymer film layer;
a second polymer film layer; and
a layer of indium tin oxide disposed between the first polymer film layer and the second polymer film layer, wherein the microwave energy interactive structure has at least one of
an oxygen transmission rate of less than about 0.05 cc/m²/day, and
a water vapor transmission rate of less than about 0.09 g/m²/day.

116. The microwave energy interactive structure of claim 115, wherein the microwave energy interactive structure has a water vapor transmission rate of less than about 0.08 g/m²/day.

117. The microwave energy interactive structure of claim 115, wherein at least one of the first polymer film layer and the second polymer film layer comprises polyethylene terephthalate, ethylene vinyl alcohol, barrier nylon, polyvinylidene chloride, barrier fluoropolymer, nylon 6, nylon 6,6, coextruded nylon 6/ethylene vinyl alcohol/nylon 6, silicon oxide coated film, or any combination thereof.

118. The microwave energy interactive structure of claim 115, wherein the microwave energy interactive structure has a resistivity of from about 38 to about 71 ohms/square.

119. The microwave energy interactive structure of claim 115, wherein the microwave energy interactive structure has a resistivity of from about 270 to about 277 ohms/square.

120. The microwave energy interactive structure of claim 115, wherein the microwave energy interactive structure is at least one of substantially colorless and substantially optically transparent.

121. The microwave energy interactive structure of claim 115, wherein the microwave energy interactive structure comprises at least a portion of a package.

122. The microwave energy interactive structure of claim 121, wherein the portion of the package is at least one of substantially colorless and substantially optically transparent.

123. The microwave energy interactive structure of claim 115, wherein the layer of indium tin oxide is operative for heating in response to microwave energy.

124. The microwave energy interactive structure of claim 123, in combination with a food item having a surface that is desirably at least one of browned and crisped.

125. A method of using the combination of claim 124, comprising exposing the food item and microwave energy interactive structure to microwave energy so that the layer of indium tin oxide heats and at least one of browns and crisps the surface of the food item.

* * * * *